US012160726B2

(12) United States Patent
McCoy

(10) Patent No.: US 12,160,726 B2
(45) Date of Patent: Dec. 3, 2024

(54) SYSTEMS AND METHODS FOR COMMUNICATING AUDIO DATA VIA A DISPLAY DEVICE

(71) Applicant: Sony Interactive Entertainment LLC, San Mateo, CA (US)

(72) Inventor: Charles McCoy, San Diego, CA (US)

(73) Assignee: Sony Interactive Entertainment LLC, San Mateo, CA (US)

(*) Notice: Subject to any disclaimer, the term of this patent is extended or adjusted under 35 U.S.C. 154(b) by 114 days.

(21) Appl. No.: 17/864,315

(22) Filed: Jul. 13, 2022

(65) Prior Publication Data

US 2024/0022867 A1   Jan. 18, 2024

(51) Int. Cl.
*H04B 1/00* (2006.01)
*H04L 67/306* (2022.01)
*H04S 3/00* (2006.01)
*G02B 27/01* (2006.01)

(52) U.S. Cl.
CPC ............ *H04S 3/008* (2013.01); *H04L 67/306* (2013.01); *G02B 27/017* (2013.01); *H04S 2400/11* (2013.01)

(58) Field of Classification Search
CPC .... H04S 3/008; H04S 2400/11; H04L 67/306; G02B 27/017
USPC ................................................. 381/119, 104
See application file for complete search history.

(56) References Cited

U.S. PATENT DOCUMENTS

| 2008/0025698 A1* | 1/2008 | Momaki | H04N 21/4325 348/E5.122 |
| 2009/0148135 A1* | 6/2009 | Ishino | H04N 21/4394 386/248 |
| 2010/0302401 A1* | 12/2010 | Oku | H04N 9/8211 348/222.1 |
| 2017/0024184 A1* | 1/2017 | Yuki | G06F 3/165 |
| 2017/0134807 A1* | 5/2017 | Shaw | H04N 21/4622 |
| 2017/0134821 A1* | 5/2017 | D'Amelio | H04N 21/42203 |
| 2018/0184140 A1* | 6/2018 | Danker | H04N 21/4758 |
| 2022/0132217 A1* | 4/2022 | Aher | G06V 20/41 |
| 2022/0360742 A1* | 11/2022 | Krol | G10L 25/51 |
| 2022/0383849 A1* | 12/2022 | Benedetto | H04L 67/10 |
| 2023/0384592 A1* | 11/2023 | Dorn | G06F 3/011 |

OTHER PUBLICATIONS

PCT/US2023/069914 Notification of Transmittal of the International Search Report and the Written Opinion of the International Searching Authority, or the Declaration, PCT/ISA/220, and the International Search Report, PCT/ISA/210, Sep. 22, 2023.

(Continued)

*Primary Examiner* — William J Deane, Jr.
(74) *Attorney, Agent, or Firm* — Penilla IP, APC

(57) ABSTRACT

A method for communicating audio data via a display device is described. The method includes accessing a first user profile within a first user account, and accessing display data generated based on one of the plurality of sounds upon accessing the first user profile. The method further includes outputting the display data in a language. The language is determined based on the first user profile. The method includes sending the display data to display the display data in the language on a first display device.

22 Claims, 12 Drawing Sheets

(56) References Cited

OTHER PUBLICATIONS

MotionIsland: "4 Tutorials to Create an After Effects Audio Spectrum Visualizer", Apr. 20, 2018, pp. 1-4, XP093081458, https://blog.motionisland.com/create-an-after-effects-audio-spectrum-visualizer/#.ZQFWPXZBwR8.
Soledad Zarate: "Captioning and Subtitling for d/Deaf and Hard of Hearing Audiences" In"Captioning and Subtitling for d/Deaf and Hard of Hearing Audiences", Jan. 14, 2021, UCE Press, London WCIE 6BT, XP093080436, ISBN: 978-1-78735-710-5, pp. 1-178, DOI: https://Captioning-and-Subtitling-for-Deaf-and Hard-of-Hearing-Audiences.pdf>.

* cited by examiner

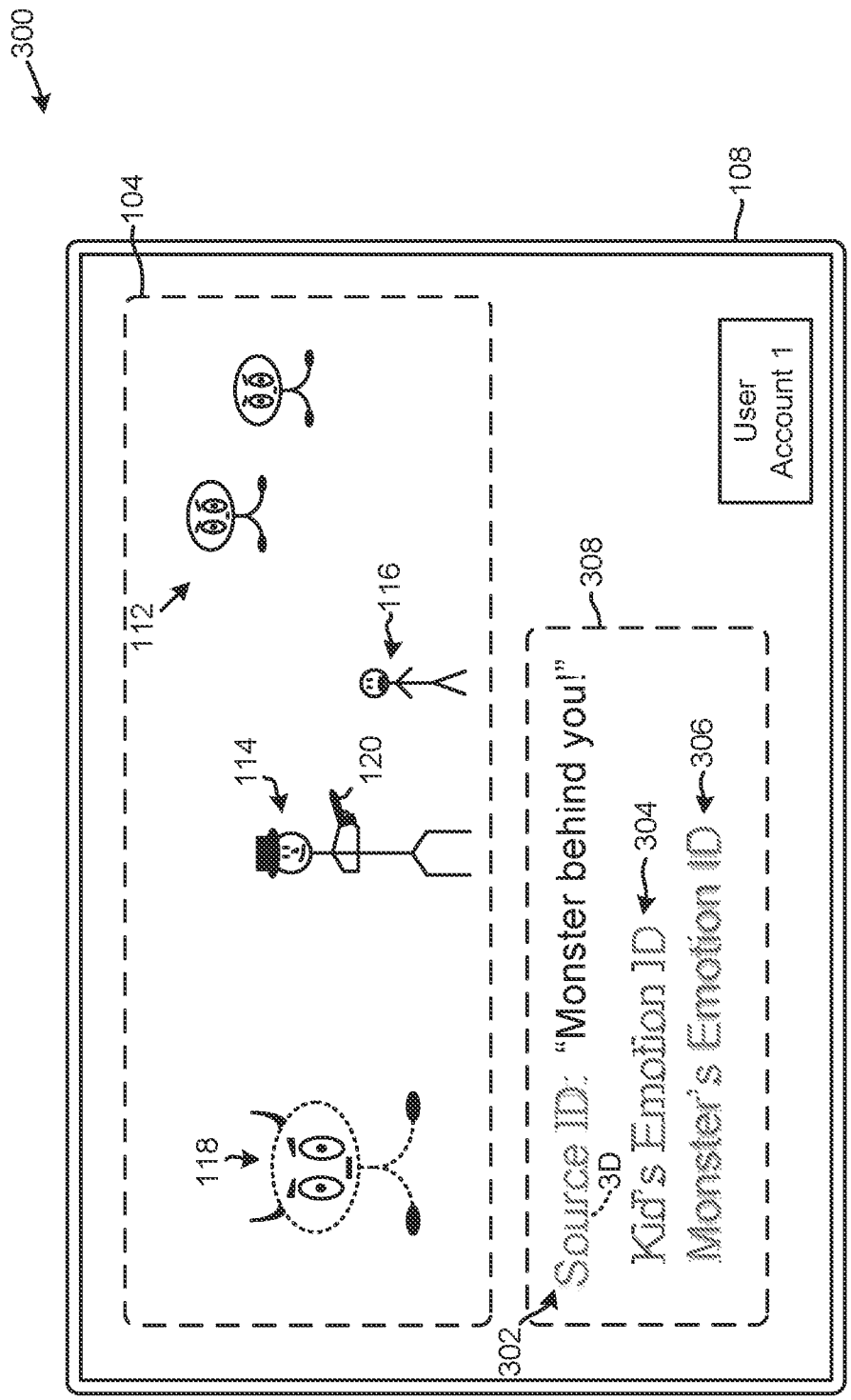
FIG. 3 (3D)

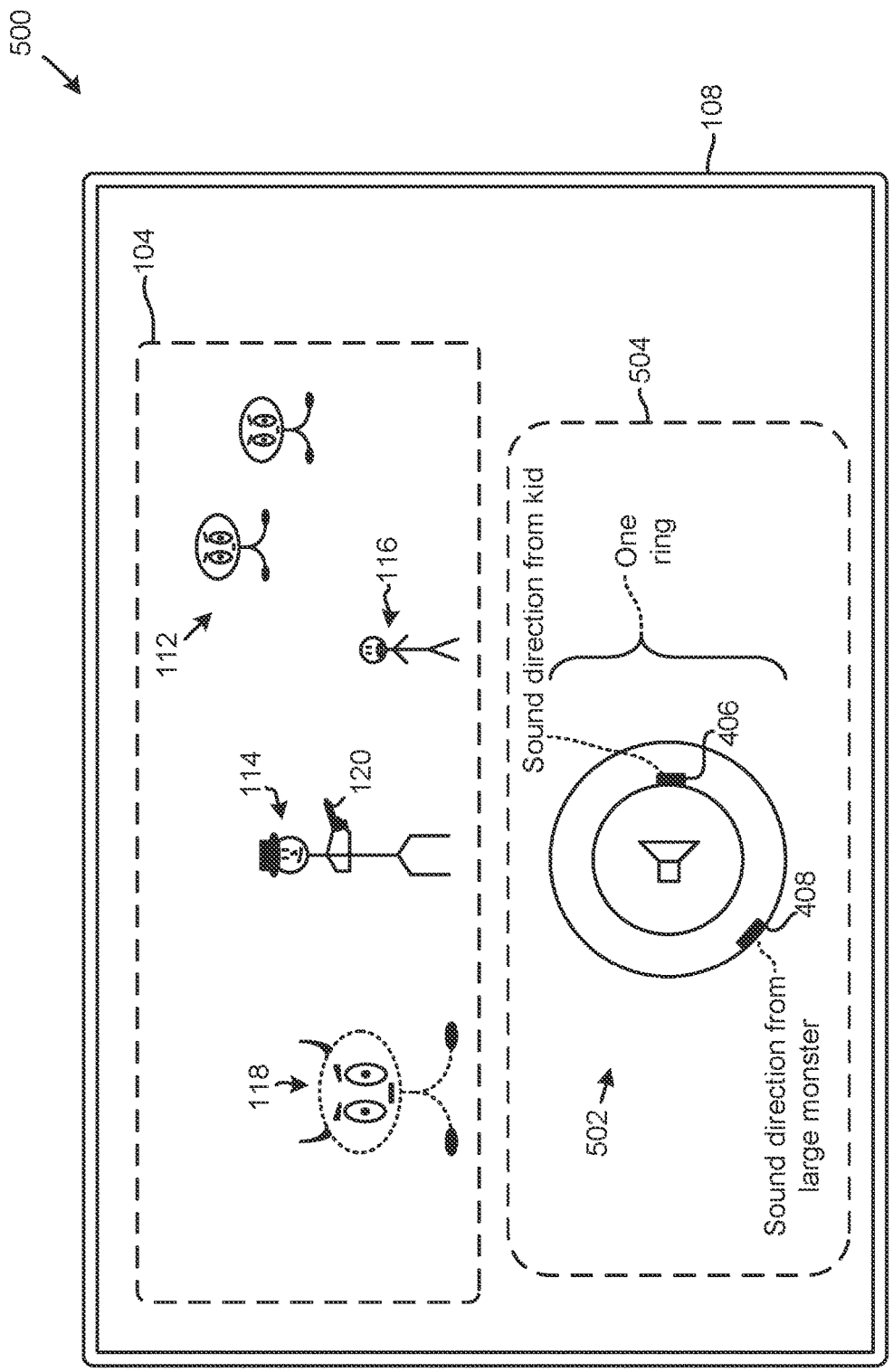
FIG. 5 (Single Ring)

(Same Hue for Different Sources)

FIG. 7 (Wrap)

FIG. 8 (Spiral)

(Overlay logic at Client Device)

(Overlay logic at Server System)

SYSTEMS AND METHODS FOR COMMUNICATING AUDIO DATA VIA A DISPLAY DEVICE

FIELD

The present disclosure relates to systems and methods for communicating audio data via a display device.

BACKGROUND

The world is moving towards media. Media is all around us and is consuming a greater percentage of our daily lives. For example, people watch Netflix™ shows, movies, play video games, etc., sometimes for hours each day. Also, as another example, people listen to audio, such as music or talk shows or finance shows. The pandemic has exacerbated an amount of time spent accessing the media.

Some information regarding the media is conveyed via sub-titles that are generated with the media. However, the information does not convey sufficient information to a user.

It is in this context that embodiments of the invention arise.

SUMMARY

Embodiments of the present disclosure provide systems and methods for communicating audio data via a display device.

In an embodiment, information is represented visually from audio-accompanying programming, such as a movie, a television (TV) show, a video game, or audio-only programming, to make the information available to people who cannot perceive the information from the audio. For example, some people cannot perceive the information due to hearing impairments, or the television having the sound off or set to a low volume. To illustrate, the television when placed in a noisy bar or in a home where people are sleeping has the low volume, and the low volume cannot be heard by humans.

In one embodiment, several different types of sounds contribute to the audio-accompanying programming. Sub-titles focus mostly on spoken words, with occasional indications, such as "music playing" or "dog barking", that identify that other sounds are present without giving much detail.

Examples of the sounds that contribute to the audio-accompanying programming include speech, music, ambient sounds, and Foley™ sounds. As an example, the speech includes sounds, such as spoken words, grunts, or barks, created by characters of the programming for communication. The spoken words can be translated into a different language to be understood by an intended audience. An example of the music is an accompanying musical soundtrack, which can be choreographed to an action taking place or is intended to set a mood or is intended to elicit a particular emotion in the audience. As an example, the ambient sounds include an ongoing sound corresponding to what an environment, such as a location, surrounding characters of the programming would sound like in the programming. Illustrations of the ongoing sound include sounds of a babbling brook, a machine running, birds chirping, wind flowing through leaves of trees, waves on a beach, a machine running, crowd noise, or automobiles passing by. As an example, the Foley sounds include sounds corresponding to actions that take place in the programming, such as a sound of a door closing, a gunshot, a crate being smashed, or glass breaking. To illustrate, the Foley sounds can correspond to action that is not seen, such as a monster approaching from behind.

In an embodiment, some aspects of audio information, such as a mood or emotional character of the sound, or a direction in which a particular sound is coming from, are left out of the sub-titles.

In one embodiment, a source indicator, such as a source identifier, is provided. The source indicator associates sub-title text with a source of an audio, such as a character that spoke the text or a machine that is generating a beeping sound indicated by the sub-title text. The source indicator can use one or more of text color, text font, text style, text size, text location on a screen or within a sub-title area, or use a label for the text, such as an icon, symbol, or name. The icon to label spoken text can be an image of a character's head to make it easy to associate the sub-title text with the character who spoke that line.

In an embodiment, auto generation of enhanced sub-title information is provided. While static programming, such as the movie or the TV show, can have static corresponding enhanced sub-title information that is hand crafted, dynamic content, such as a video game or playback of programming that does not have corresponding enhanced sub-title information, has the enhanced sub-title information created dynamically. For some content, such as the video game, meta-data used for the generation of the audio is available to be used in the generation of the enhanced sub-title information. In such a case, the meta-data is used to determine information that is intended to be communicated in the audio and the use of the meta-data can ensure that generated sub-titles of the enhanced sub-title information represent that same information. For some content, such as playback of the TV show, the movie, or recorded game play, there is no metadata available to use in generation of the enhanced sub-title information. In such a case the system will need to analyze the audio to determine what sounds are present in the audio and what information is being communicated through the audio. Artificial intelligence (AI) can be used to "reverse engineer" the audio to determine what sound elements it contains, what information, such as mood or emotion, are being communicated through the audio, and what a human listening to the audio would perceive.

In an embodiment, facial expressions to show emotions are described. A part of what is missing in traditional sub-titles is a mood that the audio is trying to set, emotions that the audio is trying to evoke, or an emotion with which a dialog is spoken. As humans are good at reading emotions from facial expressions, images of faces can be used to express moods and emotions. Different faces can be associated with different elements of the audio, such as one face for emotions of the music and another face for the mood of the ambient sounds. Different faces can look like different people, or can be located in different locations, such as having a dedicated position where a face will appear to indicate the mood of music that is playing. There can be a face dedicated to threats communicated through the audio, with expressions corresponding to emotions, such as "What was that?" when rustling in trees nearby in a scene of the audio-accompanying programming is heard, and "Run!" when an angry beast is heard charging towards a character. The faces used to communicate emotion can be static renderings that are displayed to correspond to particular emotions or can be animated to change dynamically as the audio changes. Also, icons for emotions can be included in sub-title text indicate the emotion with which each portion of text was spoken. This can be useful in cases where a speaker character of the audio-accompanying programming is not shown in the video content, the video content is not seen by the audience, or when the audience is too busy reading the sub-titles to pick up on the facial expressions of the speaker character. An icon having the face of the character that is speaking can also show a facial expression corresponding to the emotion with which the line is being spoken. This can be useful to quickly identify both which character is doing the speaking along with the emotion the line is spoken with, which can be especially useful if the character doing the speaking is not shown in the video content.

In an embodiment, punctuation is described. In some cases, punctuation or symbols can be used to indicate certain information about the audio, such as a direction and volume level of different sound sources or a mood or emotion of music. By using standard punctuation characters, an existing system capable of rendering American Standard Code for Information Interchange (ASCII) subtitles can represent information about volume and direction of sounds. Systems that support more characters, such as Unicode, can allow for a larger pallet of symbols to be used. For example, the punctuation "{^}" indicates a quiet sound coming from the direction the camera is facing, while the punctuation "{{>} } }" indicates a loud sound coming from the right of where the camera is facing.

In one embodiment, static display locations are described. The sub-titles are a stream of text that scrolls by as more of the text is displayed. The sub-titles are not a good fit for display of audio information other than text. For example, the Foley sounds, the mood of the ambient sounds, or the emotions that the music is trying to evoke cannot be represented by the sub-titles. Sounds that are long lived, such as the music playing, can be represented in a location that is not scrolled with the sub-title text so that it is continually visible while the corresponding sound is continuously playing. For example, there can be a portion of a display reserved for showing text, symbols, or images used to convey information about ongoing sounds, such as the music or ambient background sounds.

In an embodiment, sudden noises are described. Some noises are sudden and meant to startle the audience, just as a character in the programming would be startled by those noises. The startling effect of the noise is lost when the noise is explained in sub-title text, such as "[Gunshot]". To preserve the startling effect of the noise, there can be a sudden and dramatic change in the display to correspond to the sudden and dramatic change in the audio and generate much of the same reaction. For example, the screen or a portion of the screen can flash when a sudden noise is heard. In addition to the sudden and dramatic change, more information can be provided to indicate what a source of the sudden noise is. For example, a particular portion of the display can be reserved for indicating a source of Foley noises that are included in the audio, and the indicator can be text, symbols, or images. As another example, in the video game, different colors can be flashed to correspond to different sources for the sudden noises.

In one embodiment, use of borders to provide information from the audio is described. The borders around a whole screen or portions of the screen, such as, a map, a health status display area, or an area used to display subtitles, can be used to display information that would otherwise be communicated through the audio. For example, a red border around a health display area indicates that a corresponding creature, such as a monster, is close to death and corresponds with moaning sounds or difficult breathing sounds from that creature. As another example, a green border around a health display area can correspond to the creature having healed with a spell and can correspond to a sound of the healing spell being cast.

In the embodiment, different border characteristics can convey different information. For example, each color, such as hue and brightness, in which a border or portion of a border is displayed conveys different information. As another example, a thick border can indicate an aspect of the audio, such as, something that is louder, more prominent, or more urgent. As yet another example, a pattern of a border, such as a plain border, can have a different meaning than one with art-deco edges, frayed edges, or lacy looking and full of holes. As still another example, a combination border can have multiple components. To illustrate, a border with polka-dots on it can convey one type of information with a background of the border while the polka-dots can convey information about a different aspect through things such as their color, size, shape, number, density, and what percentage of the border they occupy. As another example, different portions of a border can convey different information, such as a left portion of a border giving information about what is to the left of a character and a right portion of the border giving information about what is to the right of the character. As yet another example, multiple nested borders can give information about different aspects, such as an inner border giving information about a character and an outer border giving information about that character's companion. Borders around different portions of the display can give information about different aspects of the audio or give different types of information. As another example, a change in a border can indicate information about aspects of a game. To illustrate, the border can flash when a sudden noise such as a gunshot is heard. As another illustration, a shimmering border can slow down when a creature to which the border corresponds is dying. In the illustration, the shimmering border is generated based on audio of the creature's breathing slowing or getting more difficult.

In an embodiment, use of an additional display device for displaying the sub-titles and the enhanced sub-title information from audio data output with a scene is described. While the sub-titles are displayed on top of corresponding video programming, one or more additional displays are used to display the enhanced sub-title information in addition to what is shown over top of corresponding video programming or instead of displaying anything on top of corresponding video programming. The sub-titles displayed on top of corresponding video programming obscures a portion of the video programming and can be distracting to viewers, especially those who are not reading the sub-titles, which can often be the case when multiple people are watching the same programming. Adding more information to what is conveyed through the sub-titles can make display over top of corresponding video programming even more distracting to someone who is not reading the sub-titles. For example, a second display can be a mobile device, such as, a smart phone, a tablet, or a laptop computer, or can be a television screen or a computer monitor. In the example, the second display can be used to display the enhanced sub-title information to accompany the display of corresponding video programming on a main display device. Such a setup can allow what is displayed on each device to be customized to a particular viewer. To illustrate, a first viewer views sub-title information in English on a first mobile device while a second viewer views sub-title information in Spanish on a second mobile device and a third viewer views only the emotional icons without any text corresponding to the speech in the audio on a third mobile device.

An implementation of the two display devices has two separate video outputs, such as High Definition Multimedia Interface (HDMI) jacks, from a device, where one of the outputs provides the second display rendering and the other provides the corresponding video programming. One example of using such an implementation would be to plug two televisions into the device and mount the television for the second display above the television for the corresponding video programming. In a noisy environment, such as a sports bar, where the audio is turned off or is not loud enough to understand over the background noise, such a use would allow viewers to see both the video programming and the enhanced sub-title information from the corresponding audio.

In an implementation, the second display can display the corresponding video programming in addition to sub-text information. Such an implementation would be convenient for the viewer as they would not need to shift their gaze from one display to another to switch between viewing the sub-text information and viewing the corresponding video programming. Such a display can be in a portion of the display where it is not obscured by sub-text information or can have subtext information displayed on top of the corresponding video programming.

Augmented reality (AR) or virtual reality (VR) viewing devices can be used to see the enhanced sub-title information on a display other than the display showing the corresponding video programming. Such devices can provide the sub-title information specific to a particular viewer without disturbing other viewers.

In an implementation, use of three-dimensional (3D) display for display of information from audio output with a scene is described. The 3D display is used to display information about the audio portion of programming on top of the corresponding video portion of the display in a way that is not obtrusive to those who do not wish to see the information about the audio. The information can be displayed by lightening pixels in the display for one eye and darkening the corresponding pixels in the display for the other eye. When viewed without 3D glasses, the lightening and darkening cancel out to average out to the original pixel value, thus having the display not be noticeable to someone viewing without 3D glasses. When viewed through glasses that filter what is seen to just the display for one of the eyes, such as through glasses where both lenses are polarized the same, the viewer can clearly see the displayed information about the audio.

In an embodiment, symbolic depiction of additional audio information is described. In many cases a distinctive sound is used to indicate the presence of particular elements in the TV show, the movie, or the video game. For example, a particular type of monster has heavy breathing that can be heard when nearby, or a generator for a recharge point has a mechanical humming that can be heard when nearby. These distinctive sounds are added to audio to convey specific information, so it is desirable for that information to be as easily available to people who get the audio information through a visual representation. Different symbols or icons can be used to represent the presence of these different distinctive sounds. Such a graphical representation can quickly convey the presence of the corresponding element, without the delay that would come from needing to read text.

In one embodiment, an implementation of a directional indicator includes a ring around each sound icon where one or more marks are included on the ring to indicate the direction or directions in which the sounds are coming from. A mark at the top of the ring can indicate that the sound is coming from directly in front of the player, while a mark at the right of the ring indicates that the sound is coming from the player's right. A mark with sharp borders indicates that the direction can be clearly heard while a mark with diffused borders indicates that the direction of the sound is less clear, such as if there are canyon walls nearby that sound bounces off of. Multiple marks can be included on the ring to indicate the presences of multiple sources of that type of sound. The ring can be made thicker so that sound sources that are nearby appear closer to the inner edge of the ring while sound sources that are farther away appear closer to the outer edge of the ring.

In some implementations, the location on the display of an icon can correspond to the location of the source of the corresponding sound. This may be on top of the display of the corresponding video programming or may be in a specific display area dedicated to displaying sound icons.

In an embodiment, generation of graphical representation of audio is described. Graphics can be generated from analysis of audio to provide a visual depiction of that audio. Characteristics of the audio can be used to influence characteristics of the graphical representation that is generated. Characteristics of the audio used for this generation can include things such as rhythmic patterns, rhythmic speed, frequency ranges, musical key, harmonics, waveform shape, melodic progression of tones, musical style, direction sound elements are coming from, volume levels, and ongoing sounds, such as, the droning of a motor or the pattering of rainfall. For example, a graphic can be generated that is smooth when the sound is not changing much and more speckled looking when there are a lot of changes in the sound.

In some implementations, different hues correspond to different frequencies of sound. These representations can cycle around the hues of the color wheel once each octave. This would mean that if a frequency of 440 hertz (Hz) corresponding to the not A is mapped to a shade of red, then a frequency of 880 Hz for the A an octave higher would be mapped to the same shade of red. The color can be brighter for higher octaves and darker for lower octaves to represent the full range of frequencies with distinct coloration.

In some implementations, different frequencies of sound are mapped to different locations in the generated graphic. For example, one octave can span the width of a rectangular graphic, wrapping around to start a new row for the next octave. As another example, the generated graphic can be circular with the frequencies spiraling out from the center such that each octave winds around the graphic 360 degrees so that the same note an octave higher is the same direction from the center of the graphic, but further from the center.

In an embodiment, implementations can be combined, such as to have different frequencies of sound mapped to different locations in the corresponding graphic and also mapped to different colors.

In one embodiment, graphics can be generated by generating a spectrum of intensity of sound at each frequency, and then converting that spectrum into a graphic. Such a spectrum can be generated by using Fourier analysis, such as through a Fast Fourier Transform (FFT). In some cases, information about the frequencies present in the music can be obtained through meta-data about the music, such as if a game has a music soundtrack that is generated from a stream of musical instrument digital interface (MIDI) data. The graphic generation can take into account a history of the recent audio, such as the beats per minute (BPM) of how fast a piece of music is playing, or what key is being used so that key changes can be highlighted.

In some implementations, a circular graphic can have elements near the edges correspond to sound sources coming from particular directions.

In one implementation, a waveform shape or timbre of a sound output with the scene can be used in the generation of a graphic. A violin sounds different than a French horn, so it would be desirable for the visual representation of the audio from those two instruments to look different, even when they play the same notes. Similarly, a guitar can have a variety of different effects applied, such as reverb, echo, or distortion, creating significantly different sounds when the same note is played. For example, a graphic generated for an audio source that is a sine wave can look smoother than a graphic generated for an audio source of a jagged wave.

In some implementations, AI is used to partition audio into separate streams, such as a stream for speech, a stream for music, and a stream for the ambient and foley noises. Each of these streams can be analyzed separately. The resulting analysis can be combined into a single display, or the display of information from different streams can be presented separately, such as displayed in different portions of the display. For example, a first graphic can be displayed to represent the music component of the audio and a second graphic can be displayed to represent the ambient and foley sounds of the audio. As another example, AI can be used to analyze a stream that was generated to only include the music portion of the audio to determine the sentiment of what mood or emotions that music is intended to evoke in the listener. When meta-data about the generation of the audio is available, that information can be used in creating separate streams of audio information.

In one embodiment, a method for communicating audio data via a display device is described. The method includes accessing a first user profile within a first user account, and accessing display data generated based on one of the plurality of sounds upon accessing the first user profile. The method further includes outputting the display data in a language. The language is determined based on the first user profile. The method includes sending the display data to display the display data in the language on a first display device.

In an embodiment, a server for communicating audio data via a display device is described. The server includes a processor that accesses a first user profile within a first user account, and accesses display data generated based on one of the plurality of sounds upon accessing the first user profile. The processor outputs the display data in a language that is determined based on the first user profile. The processor sends the display data to display the display data in the language on a first display device. The server includes a memory device coupled to the processor.

In one embodiment, a client device for communicating audio data via a display device is described. The client device includes a processor. The processor accesses a first user profile within a first user account, and accesses display data generated based on one of the plurality of sounds upon accessing the first user profile. The processor outputs the display data in a language that is determined based on the first user profile. The processor sends the display data to display the display data in the language on a first display device. The client device includes a memory device coupled to the processor.

Other aspects of the present disclosure will become apparent from the following detailed description, taken in conjunction with the accompanying drawings, illustrating by way of example the principles of embodiments described in the present disclosure.

BRIEF DESCRIPTION OF THE DRAWINGS

Various embodiments of the present disclosure are best understood by reference to the following description taken in conjunction with the accompanying drawings in which:

FIG. 3 is a diagram of an embodiment of a system to illustrate a three-dimensional (3D) representation of the information associated with the scene.

FIG. 5 is a diagram of an embodiment of a system to illustrate a single direction identifier that includes multiple highlighted portions.

DETAILED DESCRIPTION

Systems and methods for communicating audio data via a display device are described. It should be noted that various embodiments of the present disclosure are practiced without some or all of these specific details. In other instances, well known process operations have not been described in detail in order not to unnecessarily obscure various embodiments of the present disclosure.

Figure 1:
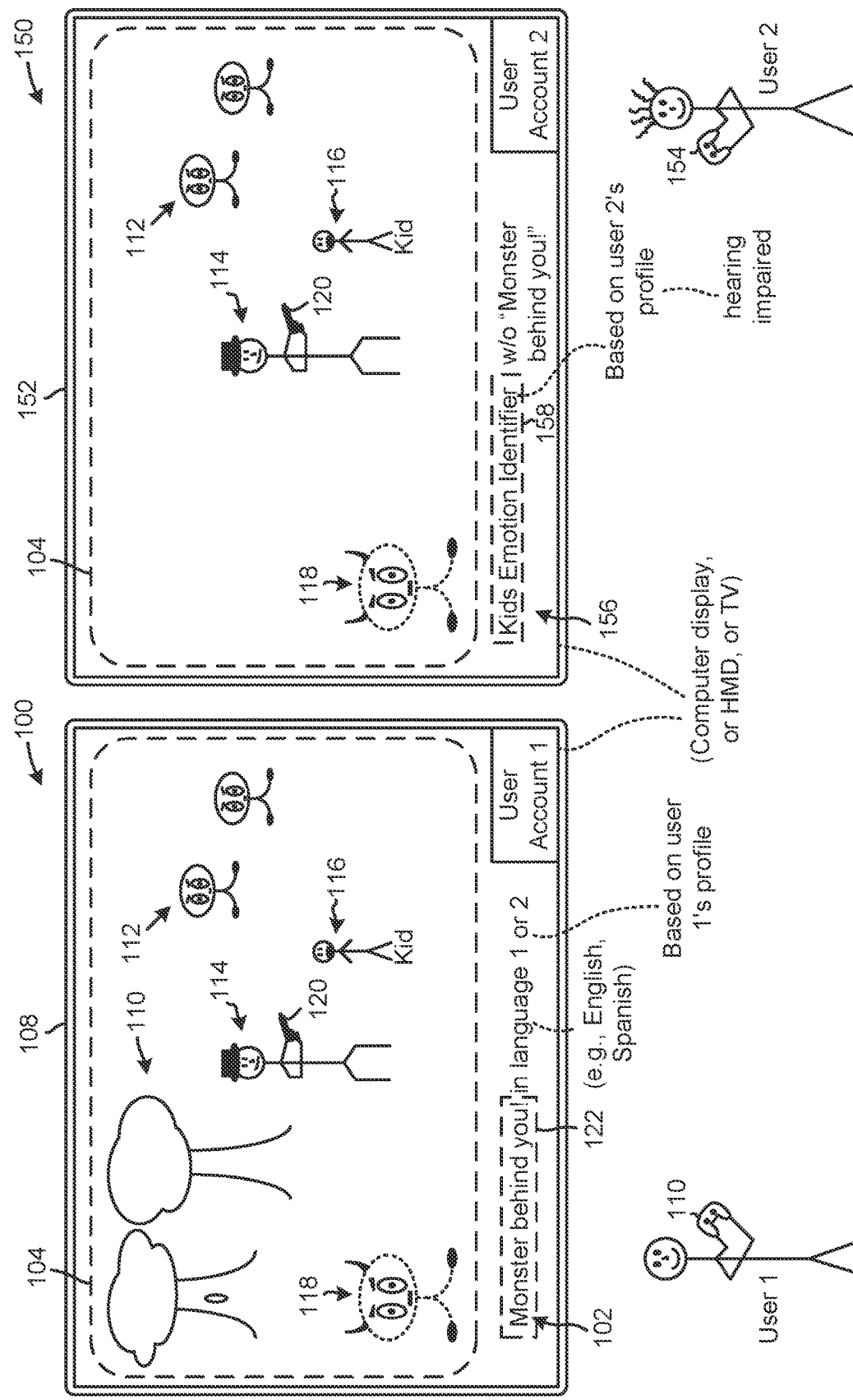
FIG. 1A is a diagram of an embodiment of a system to illustrate a display of a sub-title in a language based on a profile of a user with a display of a scene.
FIG. 1B is a diagram of an embodiment of a system to illustrate a display of an emotion identifier without displaying the sub-title.

FIG. 1A is a diagram of an embodiment of a system 100 to illustrate a display of a sub-title 102 in a language based on a profile of a user 1 with a display of a scene 104. The system 100 includes a display device 108. FIG. 1B is a diagram of an embodiment of a system 150 to illustrate a display of an emotion identifier without displaying the sub-title 102. The system 150 includes a display device 152.

Examples of a display device, as used herein, include a liquid crystal display (LCD), a light emitting diode (LED) display, and a plasma display. To illustrate, the display device is a head-mounted display (HMD), or a display monitor of a computer, or a display monitor of a smartphone, or a television, or a smart television. The display device includes one or more speakers to output sounds. Examples of a scene, as described herein, include a video scene, a series of images, an audio-only scene, a virtual reality (VR) scene, and an augmented reality (AR) scene.

Within the system 100, the user 1 has a controller 110. Also, within the system 150, a user 2 has a controller 154. Examples of a controller, as used herein, include a remote control for a television and a hand-held controller for playing a video game. As an example, a hand-held controller is coupled to a game console that is further coupled to a display device. As another example, in server-based gaming, the hand-held controller is coupled to the display device without the use of the game console. As yet another example, the controller is embedded within the display device when the display device is integrated within the smartphone. It should be noted that the game console, the computer, the smartphone, the television, one or more servers, the smart television, a combination of the game console and the one or more servers, and a combination of the computer and the one or more servers are examples of a computing device system.

Each user, such as the user 1 or 2, has a profile associated with a user account. For example, the user 1 has a profile 1 and the user 2 has a profile 2. In the example, the profile 1 is accessed via the user account 1 and the profile 2 is accessed via the user account 2. Also, in the example, the user 1 accesses the scene 104 after logging into the user account 1 and the user 2 accesses the scene 104 after logging in the user account 2. As an example, the profile of a user indicates preferences of the user. To illustrate, the profile 1 indicates that the user 1 prefers Spanish or English or Italian or German as a language. As another illustrate, the profile 2 indicates that the user 2 is hearing impaired. The user accounts 1 and 2 are stored in one or more memory devices of the computing device system.

The scene 104 is displayed on the display device 108 and the display device 152. The scene 104 includes one or more images that are displayed as a part of a television program, or a movie, or a streaming service, such as Netflix™, or the video game. Within the scene 104, there are virtual objects, such as trees 110, monsters 112, a main character 114, a supporting character 116, a large monster 118, and a gun 120.

A processor of the computing device system controls a display device, such as the display device 108 or 152, to display a scene on the display device. While the scene is displayed or before the scene is displayed, a user, such as the user 1 or 2, uses a controller, such as the controller 110 or 154, to interact with the scene. For example, the user 1 selects one or more buttons on the controller 110 to modify, such as increase or decrease, volumes of sounds output with the scene 104 displayed on the display device 108 and the user 2 selects one or more buttons on the controller 152 to modify, such as increase or decrease, volumes of sounds output with the scene 104 displayed on the display device 152. In the example, the sounds include a sound that is uttered by the main character 114, or a sound that is uttered by the supporting character 116, or a sound that is uttered by the large monster 118, or a sound that is output from the trees 110, or a sound of a virtual bullet shot from the gun 120, or a combination thereof. In the example, the volumes of sounds output with the scene 104 displayed on the display device 108 include volumes of sounds that are output via the one or more speakers of the display device 108 simultaneously with a display of the virtual objects of the scene 104 on the display device 108. Also, in the example, the volumes of sounds output with the scene 104 displayed on the display device 152 include volumes of sounds that are output via the one or more speakers of the display device 152 simultaneously with a display of the virtual objects of the scene 104 on the display device 152.

The processor of the computing device system determines whether the volumes of sounds output with the scene 104 are below a predetermined threshold, such as a predetermined volume. In addition to or instead of determining whether the volumes of sounds are below the pre-determined threshold, the processor of the computing device system determines whether a user is hearing impaired or prefers Spanish or English or Italian as a language from the profile of the user or a combination thereof. For example, the processor of the computing device system accesses the profile 1 of the user 1 to determine that the user 1 prefers Spanish as a language for sub-titles and accesses the profile 2 of the user 2 from the user account 2 to determine that the user 2 is hearing impaired.

An example of the predetermined volume is zero decibels. For example, during a display of the scene 104 on a display device, such as the display device 108 or 152, the processor of the computing device system sends a request to a processor of an audio system, such as a processor of an audio mixer, of the display device to determine whether the volume of sounds output via the one or more speakers of the display device is below the predetermined threshold. In the example, the request is for amplitudes of the sounds. In the example, upon receiving the request, the processor of the audio system provides the amplitudes of the sounds to the processor of the computing device system. Further, in the example, on one hand, the processor of the computing device system compares the amplitudes to the predetermined threshold to determine that the volumes of the sounds output with the scene 104 are not less than the predetermined threshold. In the example, on the other hand, the processor of the computing device compares the amplitudes to the predetermined threshold to determine that the volume of the sounds output with the scene 104 are less than the predetermined threshold. In the example, the processor of the computing device is coupled to the processor of the audio system via a computer network or locally without using the computer network. Moreover, in the example, the processor of the audio system is coupled to the one or more speakers of the display device to control the one or more speakers. In the example, the controller 110 is used by the user 1 to control the processor of the audio system of the display device 108 to increase or decrease the volumes of sounds output with the scene 104 on the display device 108. Further, in the example, the controller 154 is used by the user 2 to control the processor of the audio system of the display device 152 to increase or decrease the volumes of sounds output with the scene 104 on the display device 152.

It should be noted that the predetermined threshold is an amplitude that is different for different real-world environments. For example, the predetermined threshold is greater for a bar, such as a tavern, compared to a house. As another example, the predetermined threshold is greater for the bar compared to a medical housing facility for hearing-impaired people. The processor of the computing device determines a type of the real-world environment in which the one or more speakers of a display device, such as the display device 108 or 152, output the sounds with the scene displayed on the display device based on a geographic location of the one or more speakers. For example, the processor of the computing device identifies the geographic location of the one or more speakers of the display device, such as the display device 108 or 152, via a Global Positioning Satellite (GPS) system. To illustrate, the audio system of the display device is installed with a GPS tracking system to identify the geographic location of the one or more speakers of the display device, such as the display device 108 or 152. In the illustration, both the audio system and the one or more speakers of the display device are located at the same geographic location. In the illustration, the processor of the computing device communicates via the GPS system with the GPS tracking system of the audio system to determine the geographic location of the audio system and the one or more speakers of the display device. In the illustration, based on the geographical location, the processor of the computing device adjusts, such as increases or decreases, the predetermined threshold.

In some embodiments, the predetermined threshold can be established using a microphone to determine the level of sound in the environment. Different thresholds can be established for different frequency ranges, such that a different threshold can be used for sounds in the human vocal range to ensure that those sounds are not drowned out by ambient sounds in that range, while sounds in other frequency ranges may not interfere with sounds in the human vocal range as much. When a microphone is used, the predetermined threshold can change as the sound in the environment changes, such as to cause subtitles to start to be displayed when a noisy ventilation system turns on making it harder to hear the audio. As an example, the processor of the computing device system controls the microphone within a real-world environment in which a display device, such as the display device 108 or 152, is situated to obtain audio data generated from sounds in the real-world environment and to determine the predetermined threshold. Upon receiving the audio data, the processor of the computing device system determines a level, such as an amplitude, of the audio data to determine a level of sound in the real-world environment and also applies Fourier transform to the audio data to determine frequencies of the audio data. The processor of the computing device determines that the predetermined threshold is high upon determining that the frequencies of the audio data are more than a predetermined number of frequencies and that the amplitude is greater than a predetermined amplitude. To illustrate, the frequencies of the audio data interfere with sounds in a human vocal range. On the other hand, the processor of the computing device determines that the predetermined threshold is low upon determining that the frequencies of the audio data are less than the predetermined number of frequencies and the amplitude is less than the predetermined amplitude. To illustrate, the frequencies of the audio data do not interfere with sounds in the human vocal range. The high predetermined threshold is greater than the low predetermined threshold. The processor of the computing device system is coupled to the microphone.

In response to determining that the volumes of sounds are not below the predetermined threshold and that a user, such as the user 1 or 2, does not have preferences within his/her respective profile, the processor of the computing device system determines not to display information associated with the scene 104 on a respective display device, such as the display device 108 or 152. On the other hand, upon determining that the volumes of sounds output with the scene 104 are below the predetermined threshold or the user has the preferences within his/her profile or a combination thereof, the processor of the computing device system activates a feature in which the information associated with the scene 104 is displayed with a display of the scene 104. For example, the processor of the computing device system determines that the volumes of sounds output are reduced to be below the predetermined threshold before, during or immediately before a time period of utterance of words "Monster behind you!" by the supporting character 116 to the main character 114. In the example, the words are uttered when the large monster 118 is about to attack the main character 114 from a location behind the main character 114 in the scene 104.

An example of the information associated with a scene, such as the scene 104 or a scene output during the audio-only scene, includes an emotion identifier that indicates an emotion or a mood or a feeling of one or more virtual objects within the scene. To illustrate, an example of the information associated with the scene 104 includes an emotion identifier 156 that indicates an emotion of the supporting character 116. In the illustration, an example of the information associated with the scene 104 includes an emotion identifier that indicates an emotion of the large monster 118. Further, in the illustration, an example of the information associated with the scene 104 includes an emotion identifier that indicates an emotion of an ambient sound that is output by a virtual background within the scene 104. Examples of the virtual background include one or more virtual objects, such as the trees 110, a virtual water stream, virtual birds, a virtual washing machine, a virtual airplane, etc., within the scene 104 that provide a scenery to another virtual object, such as the main character 114 or the supporting character 116, within the scene 104. The virtual background provides an ambience, such as a surrounding or a virtual environment, to one or more virtual objects, such as the main character 114, in the scene 104. Also, in the illustration, an example of the information associated with the scene 104 includes an emotion identifier that indicates an emotion of music, such as a musical soundtrack or background music, that is output with a display of the scene 104. Examples of an emotion identifier, described herein, include an icon indicating the emotion, text indicating the emotion, one or more alphanumeric characters indicating the emotion, a symbol indicating the emotion, a name of the emotion, a virtual facial expression indicating the emotion, an emoji indicating the emotion, a punctuation indicating the emotion, an image indicating the emotion, a video identifying the emotion, and an animation identifying the emotion. The processor of the computing device system modifies the animation with a change in the emotion.

Another example of the information associated with the scene includes a volume level indicator that indicates a level, such as an amplitude, of a sound output with a display of the scene. To illustrate, an example of the information associated with the scene 104 includes a volume level indicator that indicates a volume, such as intensity or amplitude, of sound that is uttered by the supporting character 116. In the illustration, an example of the information associated with the scene 104 includes a volume level indicator that indicates a volume of sound that is uttered by the large monster 118. Also, in the illustration, an example of the information associated with the scene 104 includes a volume level indicator that indicates a volume of sound that is output from the virtual background. Examples of the volume level indicator, described herein, include an icon, text, one or more alphanumeric characters, a symbol, a name, a virtual facial expression, an emoji, an image, a punctuation, a video, and an animation.

Upon determining that the volumes of sounds are below the predetermined threshold or upon determining that the user 1 prefers Spanish as a language or a combination thereof, the processor of the computing device system determines to display the sub-title 102 in Spanish within a display area 122 on the display device 108. As an example, the sub-title 102 having the words "Monster behind you!" is displayed below the scene 104. Examples a display area on a display device, such as the display device 108 or 152, in which a scene is displayed include the display area that is on top of the scene, or on bottom of the scene, or to the right of the scene, or to the left of the scene, or at a corner of a display screen of the display device or at an edge of the display screen of the display device. Other examples of the display area include a display area that is next to a virtual object from which a sound is output. To illustrate, the display area 122 is next to, such as to the right of, the supporting character 116 that utters the words "Monster behind you!".

Also, upon determining that the volumes of sounds are below the predetermined threshold or upon determining that the user 2 is hearing impaired or a combination thereof, the processor of the computing device system determines to display emotion identifier 156 within a display area 158 on the display device 152. As an example, emotion identifier 156 is displayed below the scene 104. As another example, the display area 158 is next to, such as to the right of, the supporting character 116 that utters the words "Monster behind you!".

In one embodiment, a controller, such as the controller 110 or 154, is integrated within a respective display device, such as the display device 108 or 152. For example, one or more buttons of the controller 110 are touch screen buttons of the smartphone.

In an embodiment, the display area 122 is at another location with respect to the scene 104. For example, the display area 122 is above the scene 104 or to the right of the scene 104 or to the left of the scene 104. As another example, the display area 122 is a reserved space on a display screen of the display device 108. In the example, the reserved space is identified by the processor of the computing device system.

In one embodiment, the display area 158 is at another location with respect to the scene 104. For example, the display area 158 is above the scene 104 or to the right of the scene 104 or to the left of the scene 104. As another example, the display area 158 is a reserved space on a display screen of the display device 152. In the example, the reserved space is identified by the processor of the computing device system.

In an embodiment, the volumes of sounds are not output with the scene 104 but are output during audio-only programming. There is no scene displayed on a display device, such as the display device 108 or 152, during the audio-only programming. For example, the sounds are output by virtual objects, such as the supporting character 116 and the large monster 118, of the scene 104 via the one or more speakers of the display device and the virtual objects are not displayed on the display device during the audio-only programming. As another example, when there is no scene displayed on the display device and only sounds of the scene are output, the scene is sometimes referred to herein as the audio-only scene.

In one embodiment, a scene, as used herein, is a video scene or the audio-only scene. In the audio-only scene used in case of audio-only programming, one or more objects and characters are present but there is no visual display of the objects and the characters. For example, instead of the scene 104, the audio-only scene, which includes the same characters as the virtual objects of the scene 104, outputs the same sounds as that output by the virtual objects in the scene 104 and the music that is played with the scene 104. In the example, only sounds are output from the objects or the characters or a combination thereof via the one or more speakers of the display device, such as the display device 108 or 152.

Figure 2:
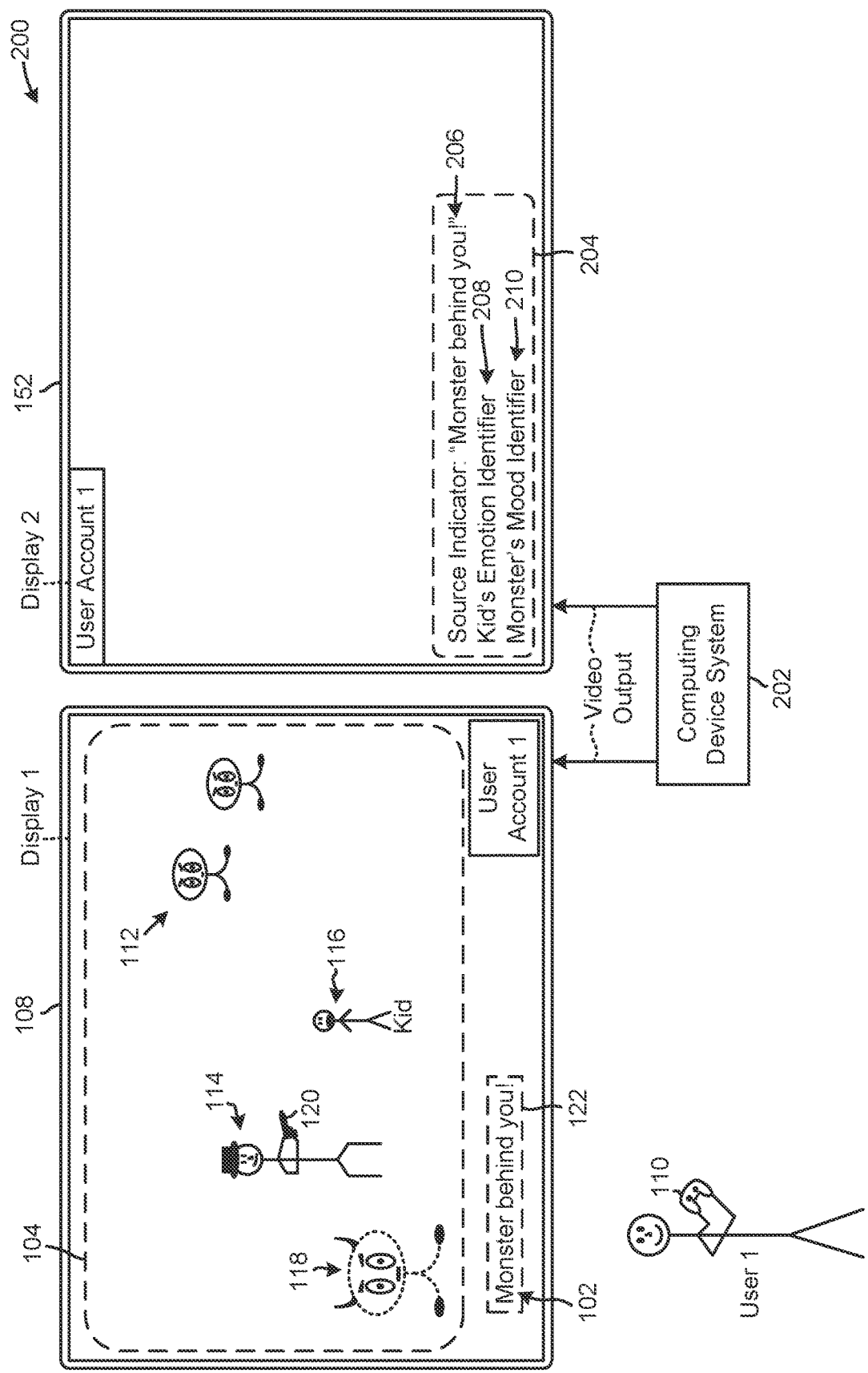
FIG. 2 is a diagram of an embodiment of a system to illustrate use of multiple display devices to display a sub-title and one or more indicators.

FIG. 2 is a diagram of an embodiment of a system 200 to illustrate use of multiple display devices 108 and 152 to display the sub-title 102 and one or more indicators. Not all virtual objects of the scene 104 are shown in FIG. 2 to avoid cluttering the figure. The system 200 includes a computing device system 202, the display 108, and the display 152.

The computing device system 202 is coupled to the display devices 108 and 152. For example, the computing device system 202 is coupled to the display devices 108 and 152 via a computer network, such as the Internet or an Intranet. As another example, the computing device system 202 is coupled to each of display devices 108 and 152 via a wired communication medium, such as a cable, or a wireless communication medium, such as Bluetooth™. For example, the computing device system 202 is coupled to the display device 108 via a first video output cable and is coupled to the display device 152 via a second video output cable. The display devices 108 are located at the same geographical location as that of the user 1.

An example of the information associated with the scene, such as the scene 104 or a scene output during the audio-only scene, includes a source indicator. The source indicator identifies a virtual object or a character that outputs a sound with an output, such as an audio output via the one or more speakers of the display device or a display, of the scene. To illustrate, an example of the information associated with the scene 104 includes a source indicator 206, which identifies a source, such as the supporting character 116, that utters the words "Monster behind you!". Examples of a source indicator, described herein, include an icon of the source, text indicating the source, one or more alphanumeric characters indicating the source, a symbol indicating the source, a punctuation indicating the source, a name of the source, an image indicating the source, a video identifying the source, a color identifying the source, and an animation identifying the source.

Upon determining that the volumes of sounds are below the predetermined threshold or upon determining that the user 1 is hearing impaired from the profile 1 or a combination thereof, the processor of the computing device system 202 determines to display the sub-title 102 within the display area 122 on the display device 108 and determines to display a source indicator 206 identifying the supporting character 116 that utters the words, "Monster behind you!", an emotion identifier 208 identifying an emotion of the supporting character 116 while uttering the words, and an emotion identifier 210 identifying a mood of the large monster 118 in the scene 104 within a display area 204 on the display device 152. For example, the sub-title 102 is displayed on the display device 108 and any other information associated with the scene 104 is displayed on the display device 152. In the example, the source indicator 206, is displayed within the display area 204, and next to words, "Monster behind you!". Also, in the example, the emotion identifier 210 indicates an emotion, such as anger or madness, of the large monster 118 while the large monster 118 utters words, "I found you!". As another example, an emotion identifier (not shown) is displayed within the display area 204, and next to words, "Rustling in trees". In the example, the rustling in trees is a sound output by the trees 110 (FIG. 1A). In the example, the emotion identifier (not shown) indicates an emotion, such as surprise or calmness, of the trees 110 while the trees 110 output the rustling sound in the scene 104. As still another example, an emotion identifier (not shown), is displayed within the display area 204, and next to words, "Terrifying music". In the example, emotion identifier (not shown) identifies an emotion of music that is output with a display of the scene 104. As another example, "Terrifying music" is a part of the emotion identifier. It should be noted that the determination that the user 1 is hearing-impaired is made by the processor of the computing device system upon accessing, such as reading, the profile 1, from the user account 1.

In an embodiment, a single profile, such as the profile 1 of the user 1, or set of system settings, such as for computing device system 202, controls what is displayed on multiple display devices, such as display device 108 and display device 152. In another embodiment, what is displayed on separate displays is controlled by separate profiles, such as the profile 1 of the user 1 controlling what is displayed on the display device 108 and the profile 2 of the user 2 controlling what is displayed on the display device 152.

In one embodiment, the sub-title 102 is not displayed next to the emotion identifier 206.

In an embodiment, the processor of the computing device determines to display the scene 104 on the display device 108 and determines to display the sub-title 102 on the display device 152 in addition to the information associated with the scene 104. For example, the processor of the computing device determines not to display the information associated with the scene 104 on the display device 108 and determines to display only the scene 104 on the display device 108. In the example, the processor of the computing device system 202 determines to display the sub-title 102 on the display device 152 upon receiving one or more selections from the controller 110 for displaying the sub-title 102 or upon determining that the volumes of sounds output with the scene 104 are less than the predetermined threshold or upon determining that the profile 1 indicates that the user 1 is hearing impaired or a combination thereof. Further, in the example, the processor of the computing device system 202 determines to display only the scene 104 on the display device 108 upon receiving one or more selections from the controller 110 for displaying the sub-title 102 or upon determining that the volumes of sounds output with the scene 104 are less than the predetermined threshold or upon determining that the profile 1 indicates that the user 1 is hearing impaired or a combination thereof.

FIG. 3 is a diagram of an embodiment of a system 300 to illustrate a three-dimensional (3D) representation of the information associated with the scene. The system 300 includes the display device 108. Again, not all virtual objects of the scene 104 are shown in FIG. 3 to avoid cluttering the figure.

Upon determining that the volumes of sounds are below the predetermined threshold or upon determining that the user 1 is hearing impaired or a combination thereof, the processor of the computing device system determines to display the information associated with the scene 104 in 3D on the display screen 108. For example, the processor of the computing device system determines to display a source indicator 302 in 3D as "Source ID", which is a three-dimensional representation of the source indicator 206 (FIG. 2). In the example, the processor of the computing device system determines to display an emotion identifier 304 in 3D as "Kids Emotion ID", which is a three-dimensional representation of the emotion identifier 208 (FIG. 2). Further in the example, the processor of the computing device system determines to display an emotion identifier 306 in 3D as "Monster's Mood ID", which is a three-dimensional representation of the emotion identifier 210 (FIG. 2). Further in the example, the source indicator 302, the emotion identifier 304, and emotion identifier 306 are displayed within the display area 308 on the display device 108. In the example, the display area 308 is located below the scene 104.

In one embodiment, a processor, such as a graphical processing unit (GPU), of the display device 108 displays the display area 308 using two sets, such as a first set and a second set, of images to represent the same information associated with the scene displayed within the display area 308. For example, the GPU of the display device 108 lightens pixels of the display device 108 for one eye of the user 1 to display the first set and darkens the corresponding pixels of the display device 108 for the other eye of the user 1 to display the second set. When viewed by the user 1 without wearing 3D glasses, the lightening and darkening cancel out to average out to the original pixel value, thus having the display not be noticeable to the user 1 viewing without 3D glasses. When viewed through the 3D glasses that filters out a different one of the first and second sets of images for each eye, such as through the 3D glasses where both lenses of the 3D glasses are polarized the same, the user 1 can clearly see the display area 308. For example, a first one of the lenses filters out the first set of images and a second one of the lenses filters out the second set of images.

In an embodiment, the display area 308 is at another location with respect to the scene 104. For example, the display area 308 is above the scene 104 or to the right of the scene 104 or to the left of the scene 104 or at a corner of the display screen of the display device 108 or at an edge of the display screen of the display device 108. As another example, display area 308 is a reserved space on a display screen of the display device 108. In the example, the reserved space is identified by the processor of the computing device system.

In one embodiment, although virtual objects are used herein, instead of each of the virtual objects, an image of a person or an image of an object is used herein. For example, in case of television programming or a movie, instead of virtual objects, an image of a person or an image of an object is used.

In an embodiment, a combination of virtual objects, an image of a person, and an image of an object is used instead of virtual objects. For example, in case of television programming or a movie, in addition to virtual objects, an image of a person or an image of an object or a combination thereof is used.

Figure 4B:
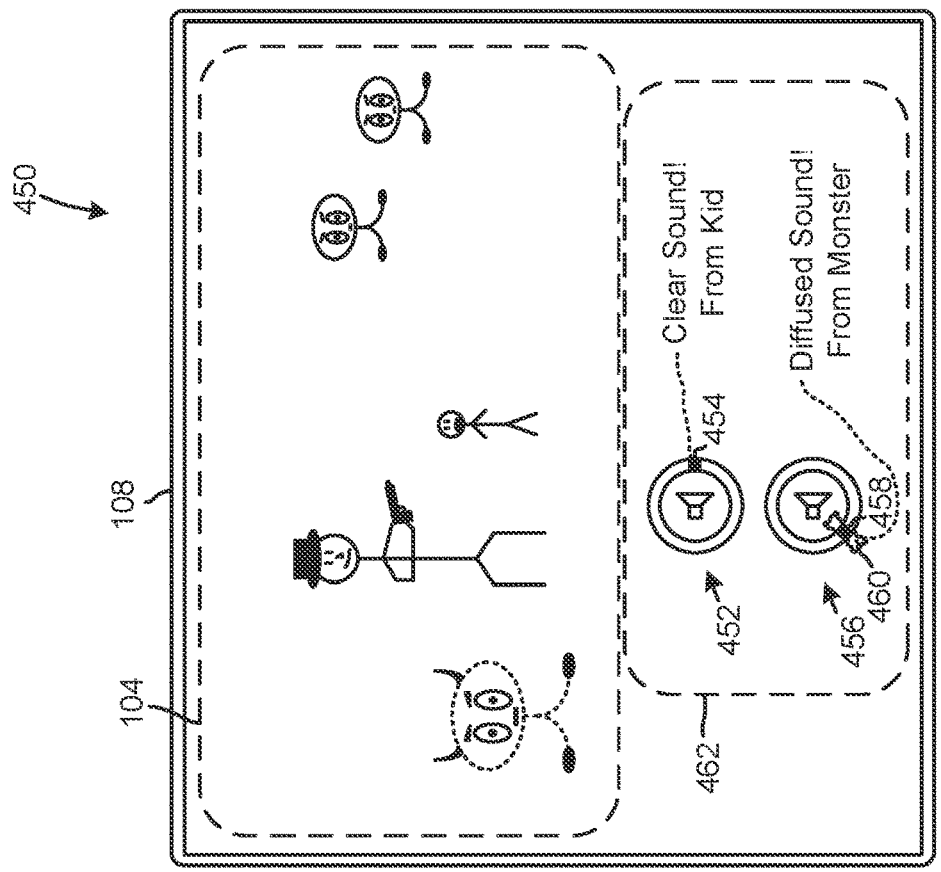
FIG. 4B is a diagram of an embodiment of a system to illustrate a display of at least one direction of at least one sound that is output with the scene and a display of an amount of noise interfering the at least one sound.
Figure 4A:
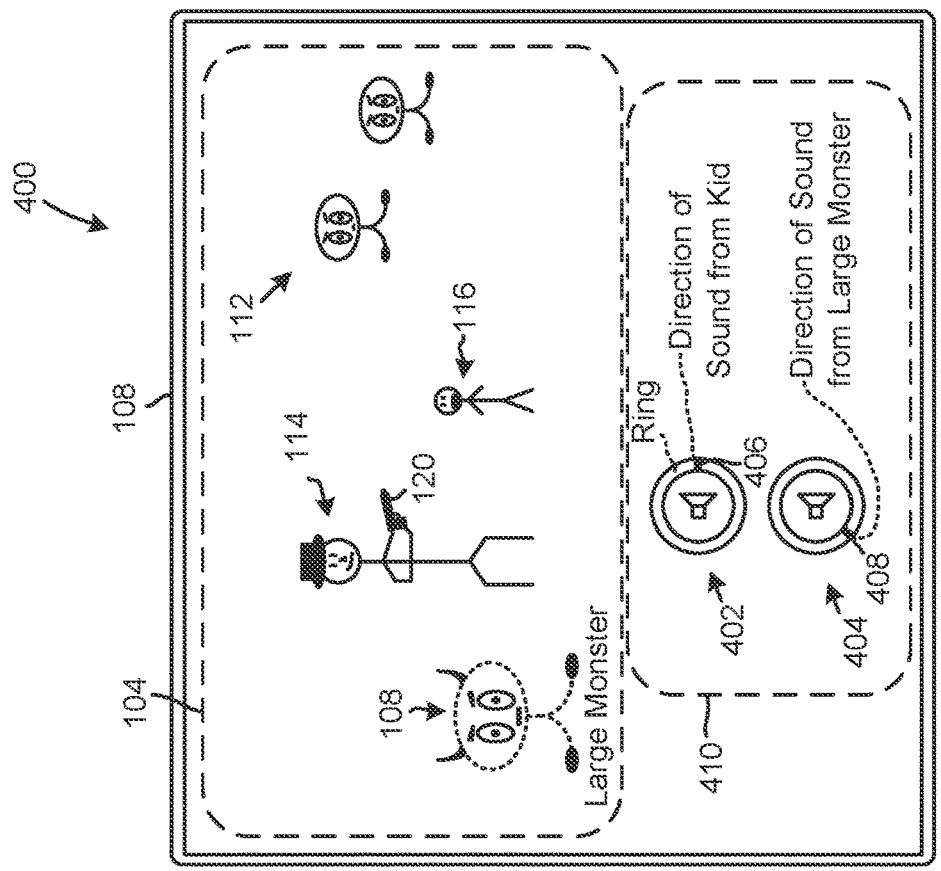
FIG. 4A is a diagram of an embodiment of a system to illustrate a display of at least one direction of at least one sound that is output with the scene.

FIG. 4A is a diagram of an embodiment of a system 400 to illustrate a display of at least one direction of at least one of the sounds that are output with the scene 104. The system 400 includes the display device 108. Again, not all virtual objects of the scene 104 are shown in FIG. 4A to avoid cluttering the figure.

Yet another example of the information associated with the scene includes a direction identifier that indicates a direction of a source of a sound output with a display of the scene. In the example, the direction is determined by the processor of the computing device system relative to a reference object, such as a virtual object, in the scene. To illustrate, an example of the information associated with the scene 104 includes a direction identifier 402 that indicates a direction of sound that is uttered by the supporting character 116. In the illustration, the direction identifier 402 has a shape of a ring around a sound icon, and the ring includes a highlighted portion 406 pointing to the direction of sound uttered by the supporting character 116. In the illustration, an example of the information associated with the scene 104 includes a direction identifier 404 that indicates a direction of sound that is uttered by the large monster 118. In the illustration, the direction identifier 404 also has a shape of a ring around a sound icon, and the ring includes a highlighted portion 408 pointing to the direction of sound uttered by the large monster 118. In the illustration, the direction identifiers 402 and 404 are displayed in a display area 410, which is below the scene 104. As another illustration, an example of the information associated with the scene 104 includes a direction identifier that indicates a direction of sound that is output from the virtual background of the scene 104. Examples of the direction identifier, described herein, include an icon, text, one or more alphanumeric characters, a symbol, a punctuation, a name, a virtual facial expression, an emoji, an image, a video, and an animation.

In one embodiment, instead of a shape of a ring, a direction identifier is generated by the processor of the computing device system has any other shape, such as a square shape or rectangular shape or a trapezoidal shape or polygonal shape or a curved shape or a straight shape or a shape of a line.

In an embodiment, the display area 410 is at another location with respect to the scene 104. For example, the display area 410 is above the scene 104 or to the right of the scene 104 or to the left of the scene 104 or at a corner of the display screen of the display device 108 or at an edge of the display screen of the display device 108. As another example, the display area 410 is a reserved space on a display screen of the display device 108. In the example, the reserved space is identified by the processor of the computing device system.

FIG. 4B is a diagram of an embodiment of a system 450 to illustrate a display of at least one direction of at least one of the sounds that are output with the scene 104 and a display of an amount of noise within the sound. The system 450 includes the display device 108. Again, not all virtual objects of the scene 104 are shown in FIG. 4B to avoid cluttering the figure.

Another example of the information associated with the scene includes a direction and noise identifier that indicates a direction of a source of a sound output with a display of the scene and indicates an amount of noise that interferes with the sound. In the example, the amount of noise is a reduction in an intensity, such as an amplitude, of the sound due to interference from other sounds or due to obstruction of the sound by virtual objects, such as a virtual canyon wall or a virtual mountain, in the scene 104. To illustrate, an example of the information associated with the scene 104 includes a direction and noise identifier 452 that indicates a direction of sound that is uttered by the supporting character 116 and an amount of noise that interferes with the sound. In the illustration, the direction and noise identifier 452 has a shape of a ring, which includes a highlighted portion 454 pointing to the direction of sound uttered by the supporting character 116. In the illustration, there is no portion partially or completely surrounding the highlighted portion 454 to indicate that there is no noise or minimal noise affecting the sound uttered by the supporting character 116. In the illustration, another example of the information associated with the scene 104 includes a direction and noise identifier 456 that indicates a direction of sound that is uttered by the large monster 118. In the illustration, the direction and noise identifier 456 also has a shape of a ring, which includes a highlighted portion 458 pointing to the direction of sound uttered by the large monster 118. Also in the illustration, the direction and noise identifier 456 has a disturbance portion 460 that partially or completely surrounds the highlighted portion 458 to indicate an amount, such as an amplitude, of noise that interferes with the sound uttered by the large monster 118. In the illustration, as the amount of noise interfering with the sound uttered by the large monster 118 gets larger, the disturbance portion 460 gets larger and vice versa. In the illustration, the direction and noise identifiers 452 and 456 are displayed in a display area 462, which is below the scene 104. As another illustration, an example of the information associated with the scene 104 includes a direction and noise identifier that indicates a direction of sound that is output from the virtual background of the scene 104 and noise interfering with the sound. Examples of the direction and noise identifier, described herein, include an icon, text, one or more alphanumeric characters, a symbol, a punctuation, a name, a virtual facial expression, an emoji, an image, a video, and an animation. As an example, a noise interfering with a sound from a source is one or more other sounds from one or more other sources.

In one embodiment, instead of a shape of a ring, a direction and noise identifier is generated by the processor of the computing device system to have any other shape, such as a square shape or rectangular shape or a trapezoidal shape or polygonal shape or a curved shape or a straight shape or a shape of a line.

In an embodiment, the display area 462 is at another location with respect to the scene 104. For example, the display area 462 is above the scene 104 or to the right of the scene 104 or to the left of the scene 104 or at a corner of the display screen of the display device 108 or at an edge of the display screen of the display device 108. As another example, display area 462 is a reserved space on a display screen of the display device 108. In the example, the reserved space is identified by the processor of the computing device system.

FIG. 5 is a diagram of an embodiment of a system 500 to illustrate a single direction identifier 502 that includes the highlighted portions 406 and 408. The highlighted portion 406 occupies an inner circular portion of the direction identifier 502 and the highlighted portion 408 occupies an outer circular portion of the direction identifier 502. The system 500 includes the display device 108. Display data for displaying the direction identifier 502 is generated by the processor of the computing device system for display in a display area 504 which is below the scene 104.

In an embodiment, the display area 504 is situated at another location with respect to the scene 104. For example, the display area 504 is above the scene 104 or to the right of the scene 104 or to the left of the scene 104 or at a corner of the display screen of the display device 108 or at an edge of the display screen of the display device 108. As another example, display area 504 is a reserved space on a display screen of the display device 108. In the example, the reserved space is identified by the processor of the computing device system.

In one embodiment, instead of the highlighted portion 408, the highlighted portion 458 and the disturbance portion 460 are displayed.

Figure 6:
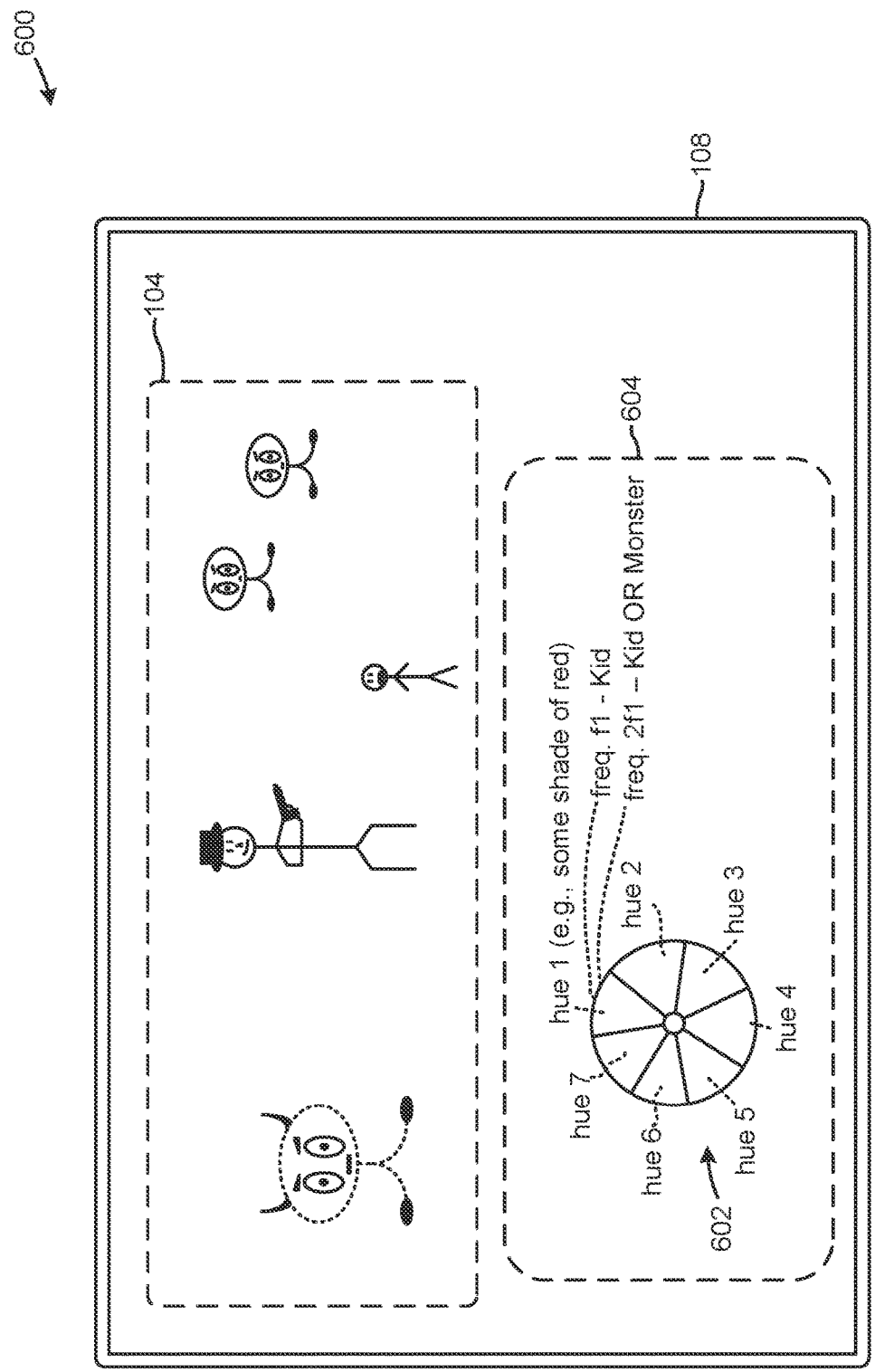
FIG. 6 is a diagram of an embodiment of a system to illustrate that the same hue is used by a processor of a computing device system to represent different sources of sounds output with the scene.

FIG. 6 is a diagram of an embodiment of a system 600 to illustrate that the same hue is used by the processor of the computing device system to represent different sources of sounds output with the scene 104. The system 600 includes the display device 108.

The processor of the computing device generates display data to display a wheel 602 that is divided into multiple segments, and each segment is filled with a different hue. For example, as a sound is output from the supporting character 116, the processor of the computing device determines frequencies of the sound and generates display data for highlighting the different segments based on the frequencies. In the example, a first segment is filled with a hue 1 to represent a frequency f1, a second segment is filled with a hue 2 to represent a frequency f2, a third segment is filled with a hue 3 to represent a frequency f3, a fourth segment is filled with a hue 4 to represent a frequency f4, a fifth segment is filled with a hue 5 to represent a frequency f5, a sixth segment is filled with a hue 6 to represent a frequency f6, a seventh segment is filled with a hue 7 to represent a frequency f7, and an eighth segment is filled with the hue 1 to represent a frequency f8. In the example, the frequency f2 is greater than the frequency f1 and so on until the frequency f8 is greater than the frequency f7. In the example, the first through seventh segments and the first segment together represent an octave, which is a series of the eight musical notes between and including two notes. To illustrate, the frequency f8 is twice the frequency f1. Moreover, in the example, each segment is highlighted by the processor of the computing device system to represent a different frequency of sound that is output with the scene 104. To illustrate, the first segment is highlighted with the hue 1 to represent the frequency f1 and is again highlighted with the hue 1 to represent the frequency 2/1, which is twice the frequency f1. In the illustration, the frequencies f1 through f7 are frequencies of sound output from the supporting character 116 and the frequency f8 is a frequency of sound output from the supporting character 116 or the large monster 118. Also, in the example, the wheel 602 is displayed within a display area 604 that is below the scene 104.

In an embodiment, the display area 604 is at another location with respect to the scene 104. For example, the display area 604 is above the scene 104 or to the right of the scene 104 or to the left of the scene 104 or at a corner of the display screen of the display device 108 or at an edge of the display screen of the display device 108. As another example, the display area 604 is a reserved space on a display screen of the display device 108. In the example, the reserved space is identified by the processor of the computing device system.

Figure 7:
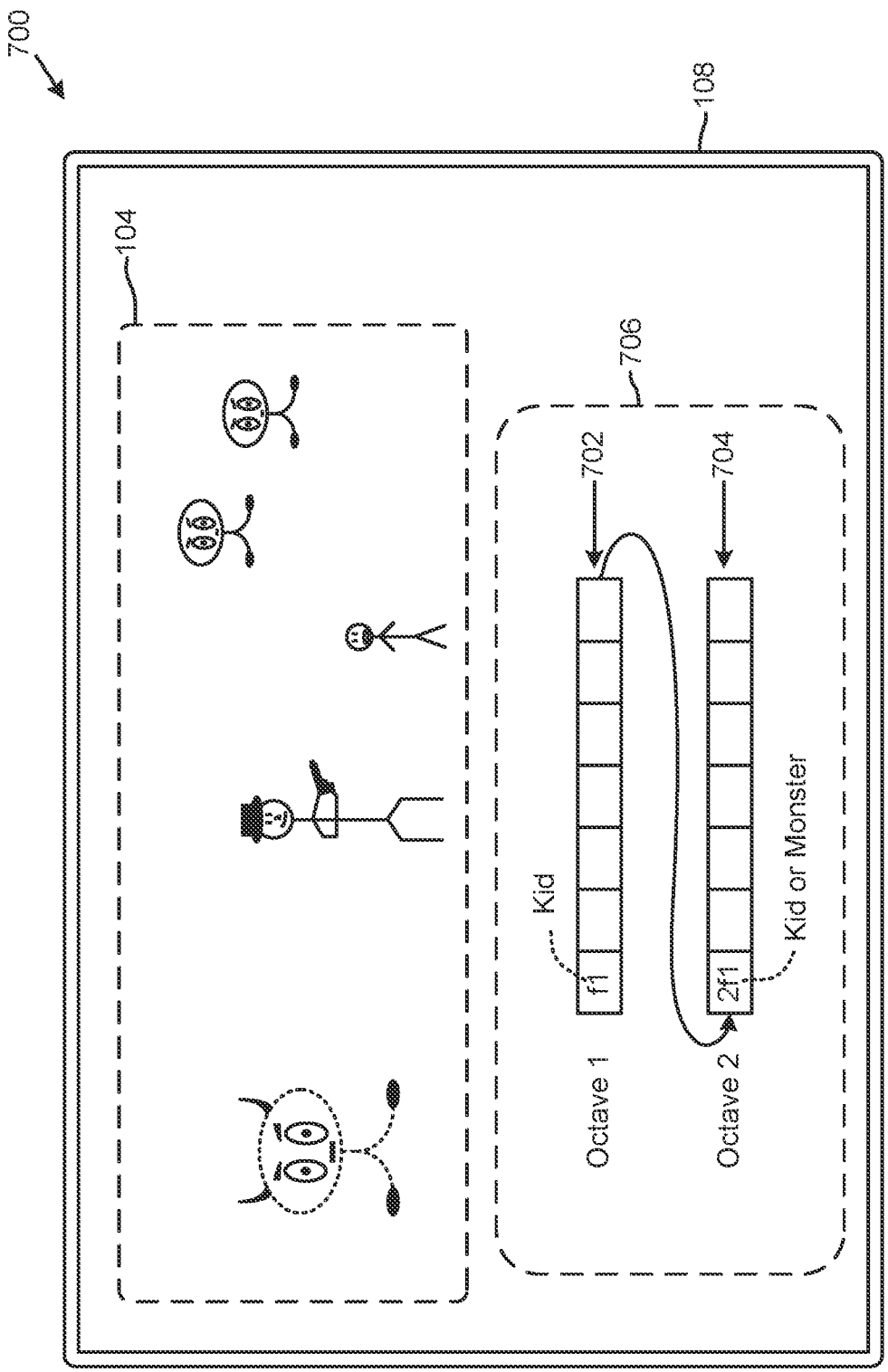
FIG. 7 is a diagram of an embodiment of a system to illustrate a wrap-around representation of frequencies of sounds emitted with the scene.

FIG. 7 is a diagram of an embodiment of a system 700 to illustrate a wrap-around representation of frequencies of sounds emitted with the scene 104. The system 700 includes the display device 108. The processor of the computing device system generates display data for displaying a row 702 of the hues 1 through 7 corresponding to the frequencies f1 through f7 and a row 704 for displaying the hue 8 corresponding to the frequency f8 and onwards. The row 704 is displayed below the row 702. More rows can be added to represent more octaves of audio information.

For example, as a sound is output from the supporting character 116, the processor of the computing device determines frequencies of the sound and generates display data for highlighting different segments of the rows 702 and 704 based on the frequencies. In the example, a first segment of the row 702 is filled with a hue 1 to represent the frequency f1, a second segment of the row 702 is filled with the hue 2 to represent the frequency f2, a third segment of the row 702 is filled with the hue 3 to represent the frequency f3, and so on until a seventh segment is filled with the hue 7 to represent the frequency f7. Further in the example, a first segment of the row 704 is filled with the hue 1 to represent the frequency f8. Moreover, in the example, each segment is highlighted by the processor of the computing device system to represent a different frequency of sound that is output with the scene 104. To illustrate, the first segment of the row 702 is highlighted to represent the frequency f1 and the first segment of the row 704 is highlighted to represent the frequency f2, which is 2/1. In the illustration, the frequencies f1 through f7 are frequencies of sound output from the supporting character 116 and the frequency f8 is a frequency of sound output from the supporting character 116 or the large monster 118. Also, in the example, the rows 702 and 704 are displayed within a display area 706 that is below the scene 104.

In an embodiment, the display area 706 is at another location with respect to the scene 104. For example, the display area 706 is above the scene 104 or to the right of the scene 104 or to the left of the scene 104 or at a corner of the display screen of the display device 108 or at an edge of the display screen of the display device 108. As another example, display area 706 is a reserved space on a display screen of the display device 108. In the example, the reserved space is identified by the processor of the computing device system.

Figure 8:
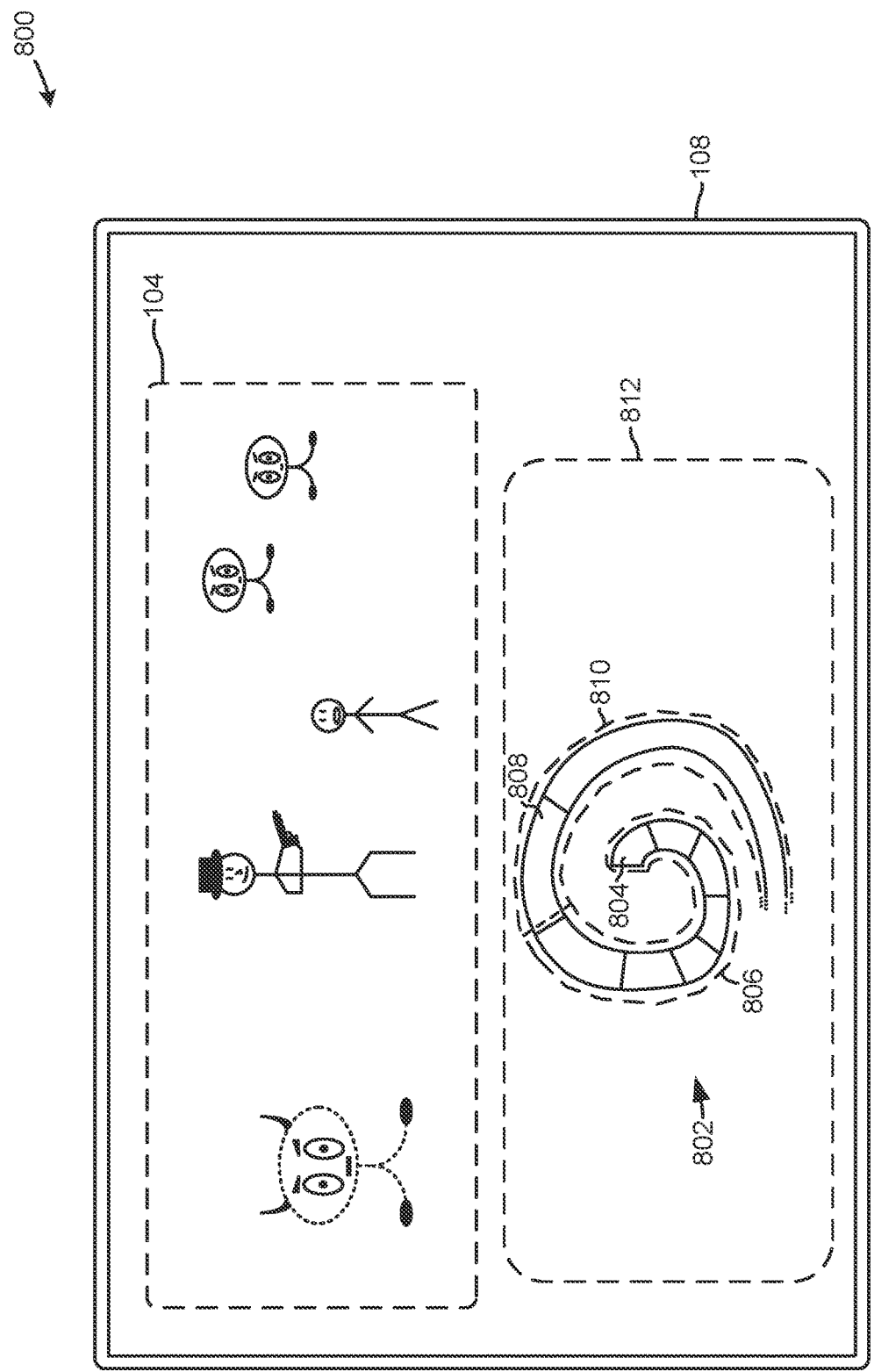
FIG. 8 is a diagram of an embodiment of a system to illustrate a spiral representation of the frequencies and onwards.

FIG. 8 is a diagram of an embodiment of a system 800 to illustrate a spiral representation of the frequencies f1 through f8 and onwards. The system 800 includes the display device 108. The processor of the computing device system generates display data for displaying a curved representation 802, such as a virtual spiral. The frequencies f1 through f8 are displayed within segments of the curved representation 802. As a sound from a source is output with the scene 104, the processor of the computing device system generates display data for displaying hues that spiral out from a center of the curved representation 802. For example, the processor of the computing device system highlights a segment 804 in an inner curved portion 806 of the curved representation 802 with the hue 1 upon determining that the frequency f1 of sound is emitted by the supporting character 116. Further in the example, the processor of the computing device system highlights different segments within the inner curved portion 806 based on the different frequencies f2 through f7 of the sound uttered by the supporting character 116. Moreover, in the example, the processor of the computing device system generates display data to spiral out the hues 1 through 7 to a segment 808 in an outer curved portion 810 of the curved representation 802 and highlights the segment 808 with the hue 1 upon determining frequency f8 of sound is emitted by the supporting character 116. In the example, the outer curved portion 810 wraps around the inner curved portion 806. The processor of the computing device system generates the display data for displaying the curved representation 802 within a display area 812 on the display device 108.

In an embodiment, the display area 812 is at another location with respect to the scene 104. For example, the display area 812 is above the scene 104 or to the right of the scene 104 or to the left of the scene 104 or at a corner of the display screen of the display device 108 or at an edge of the display screen of the display device 108. As another example, the display area 812 is a reserved space on a display screen of the display device 108. In the example, the reserved space is identified by the processor of the computing device system.

Figure 9:
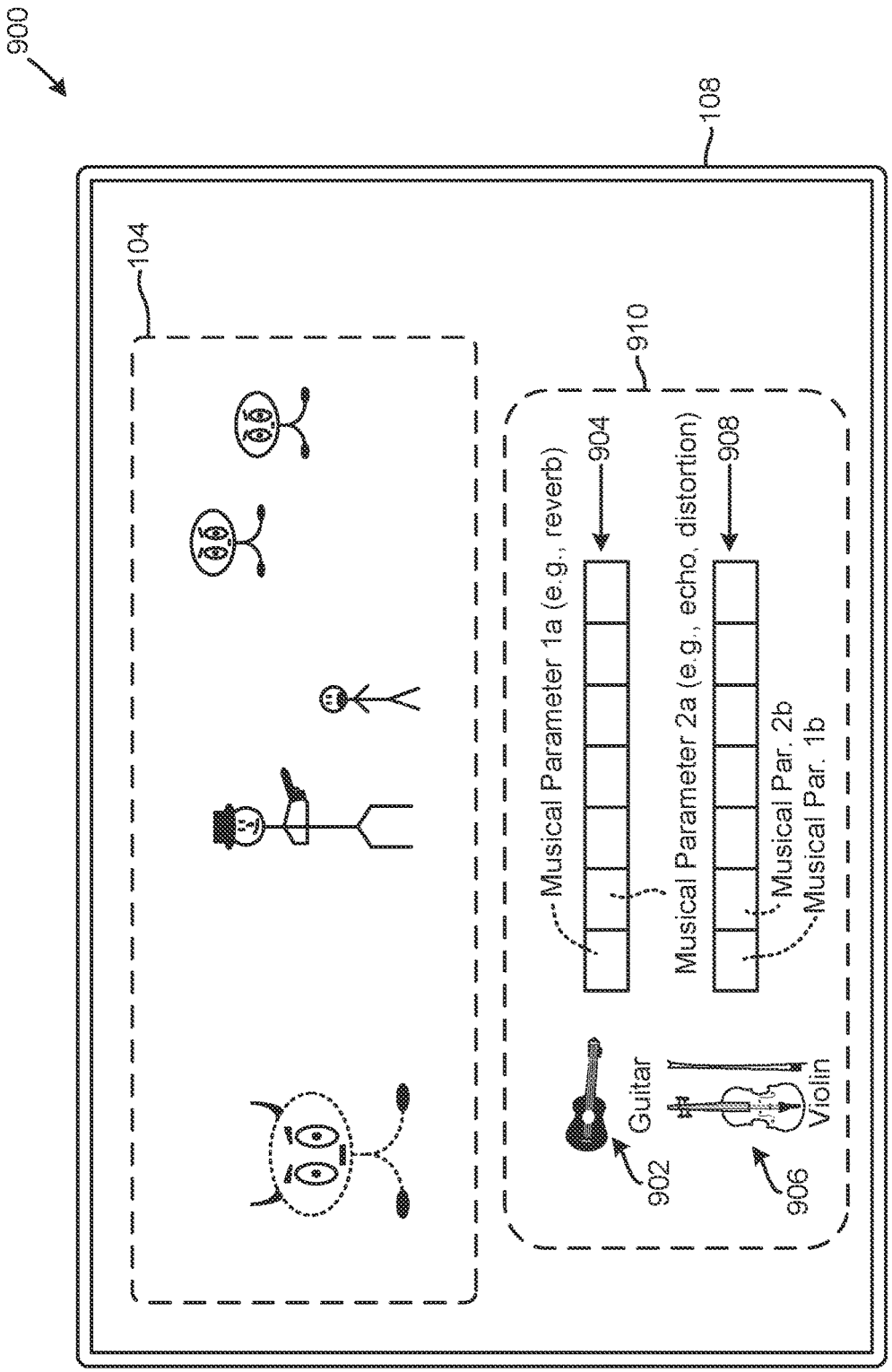
FIG. 9 is a diagram of an embodiment of a system to illustrate identifiers of musical instruments to represent sounds that are produced by the musical instruments and are output with the scene.

FIG. 9 is a diagram of an embodiment of a system 900 to illustrate identifiers of musical instruments to represent sounds that are produced by the musical instruments and are output with the scene 104. The system 900 includes the display device 108.

The processor of the computing device system identifies based on one or more frequencies and one or more amplitudes of a sound output with the scene 104, one or more musical instruments that output the one or more frequencies and the one or more amplitudes. The processor of the computing device system generates display data for displaying an identifier of each musical instrument. Moreover, the processor of the computing device system determines one or more musical parameters, such as reverb and echo, from the one or more frequencies and the one or more amplitudes. The processor of the computing device system generates display data for displaying the musical parameters.

As an example, the processor of the computing device system generates an identifier 902 having a shape of a guitar to indicate that a musical instrument determined based on one or more frequencies and one or more amplitudes of the sound output with the scene 104 is the guitar. Moreover, the processor of the computing device system generates display data for displaying a row 904 of segments, and each segment of the row 904 represents a different musical parameter determined from the one or more frequencies and the one or more amplitudes of the sound produced by the guitar. To illustrate, the row 904 includes a musical parameter 1a and another musical parameter 2a. Also, in the example, the processor of the computing device system generates an identifier 906 having a shape of a violin to indicate that a musical instrument determined based on one or more frequencies and one or more amplitudes of the sound output with the scene 104 is the violin. Moreover, the processor of the computing device system generates display data for displaying a row 908 of segments, and each segment of the row 908 represents a different musical parameter determined from the one or more frequencies and the one or more amplitudes of the sound produced by the violin. To illustrate, the row 904 includes a musical parameter 1b and another musical parameter 2b.

The processor of the computing device system generates the display data for displaying the identifiers 902 and 906, and the rows 904 and 908 within a display area 910 on the display device 108.

In an embodiment, the display area 910 is at another location with respect to the scene 104. For example, the display area 910 is above the scene 104 or to the right of the scene 104 or to the left of the scene 104 or at a corner of the display screen of the display device 108 or at an edge of the display screen of the display device 108. As another example, the display area 910 is a reserved space on a display screen of the display device 108. In the example, the reserved space is identified by the processor of the computing device system.

In one embodiment, the processor of the computing device generates display data, such as waveform data or graphics data, for displaying characteristics of a sound output with the scene 104. For example, the processor of the computing device generates the display data that represents the one or more musical parameters, such as, rhythmic patterns, rhythmic speed, frequency ranges, musical key, harmonics, waveform shape, melodic progression of tones, musical style, directions sound elements are coming from, and volume levels. To illustrate, the processor of the computing device generates graphics data that is smooth when a sound output with the scene 104 is not changing much, e.g., changes at a first frequency, and that is speckled-shaped when the sound output with the scene 104 changes much, e.g., changes at a second frequency. The second frequency of change is greater than the first frequency of change. In the illustration, the processor of the computing device determines whether the sound changes at the first frequency based on a change in an amplitude of the sound. Upon determining, in the illustration, that the amplitude changes to be outside a preset range in a preset amount of time, the processor of the computing device determines that the sound changes much. Further, in the illustration, upon determining, in the illustration, that the amplitude changes to be within the preset range in the preset amount of time, the processor of the computing device determines that the sound does not change much.

Figure 10:
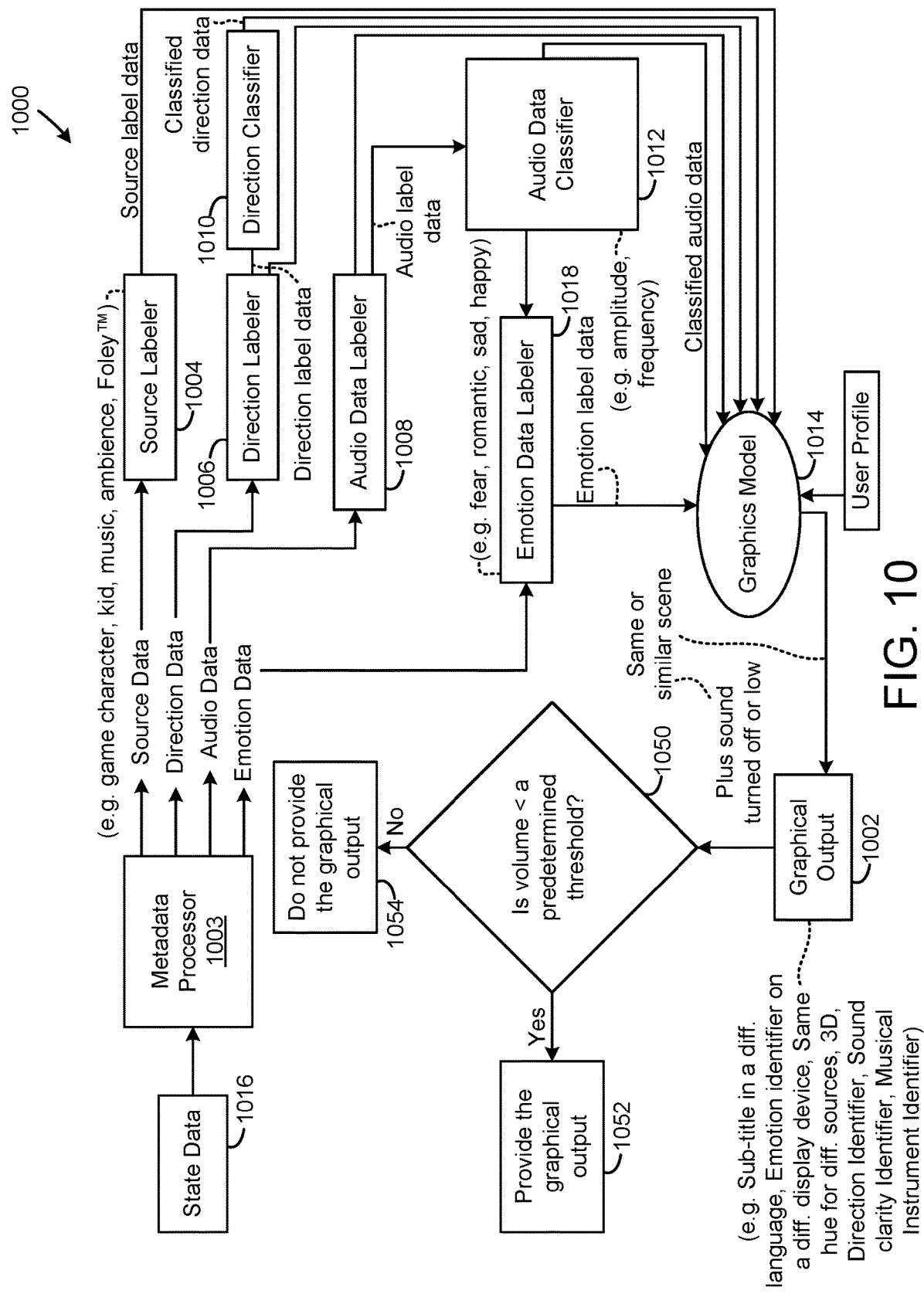
FIG. 10 is diagram of an embodiment of a system to illustrate dynamic generation of a graphical output by one or more processors of the computing device system.

FIG. 10 is a diagram of an embodiment of a system 1000 to illustrate dynamic generation of a graphical output 1002 by one or more processors of the computing device system. The system 1000 includes a metadata processor 1003, a source labeler 1004, a direction labeler 1006, an audio data labeler 1008, a direction classifier 1010, an audio data classifier 1012, an emotion data labeler 1018, a graphics model 1014. As an example, each of the source labeler 1004, the direction labeler 1006, the audio data labeler 1008, the direction classifier 1010, the audio data classifier 1012, the emotion data labeler 1018, and the graphics model 1014 is a hardware component or a software component. To illustrate, each of the source labeler 1004, the direction labeler 1006, the audio data labeler 1008, the direction classifier 1010, the audio data classifier 1012, the emotion data labeler 1018, and the graphics model 1014 is a software program or a portion of a software program that is executed by an artificial intelligence (AI) processor. To further illustrate, the graphics model 1014 is a machine learning model or a neural network or an AI model. As another illustration, each of the source labeler 1004, the direction labeler 1006, the audio data labeler 1008, the direction classifier 1010, the audio data classifier 1012, and the graphics model 1014 is a hardware circuit portion of an application specific integrated circuit (ASIC) or a programmable logic device (PLD). The AI processor and the metadata processor 1003 are examples of the one or more processors of the computing device system.

The metadata processor 1003 is coupled to the source labeler 1004, the direction labeler 1006, the audio data labeler 1008, and the emotion data labeler 1018. Also, the direction labeler 1006 is coupled to the direction classifier 1010 and the audio data labeler 1008 is coupled to the audio data classifier 1012. The source labeler 1004, the direction classifier 1010, the emotion data labeler 1018, the audio data classifier 608 are coupled to the graphics model 1014. Also, the audio data classifier 1012 is coupled to the emotion data labeler 1018.

One or more processors of the computing device system collect state data 1016 during the display of the scene 104 (FIG. 1A). For example, during the display of the scene 104, the one or more processors of the computing device system identify a first virtual object, such as the supporting character 116, that outputs the words, "Monster behind you!", and stores the words in the one or more memory devices of the computing device system. In the example, the supporting character 116 is an example of a source of the sound output using the words, "Monster behind you!". Further, in the example, the one or more processors assign a source indicator source 1 to the supporting character 116, and stores the source indicator source 1 in the one or more memory devices of the computing device system. Also, in the example, the one or more processors assign an alphanumeric identifier, such as alphanumeric 1, to the words, "Monster behind you!", and stores the alphanumeric identifier in the one or more memory devices of the computing device system. In the example, during the display of the scene 104, the one or more processors of the computing device system identify a second virtual object, such as the large monster 118, that outputs the words, "I found you!", and store the words in the one or more memory devices of the computing device system. Further, in the example, the one or more processors assign a source indicator source 2 to the large monster 118, and store the source indicator source 2 in the one or more memory devices of the computing device system. Also, in the example, the one or more processors assign an alphanumeric identifier, such as alphanumeric 2, to the words, "I found you!", and stores the alphanumeric identifier in the one or more memory devices of the computing device system. In the example, the one or more processors identify that music is output with the scene 104, assign a source indicator source 3 to the music, and store the source indicator source 3 in the one or more memory devices of the computing device system. Also, in the example, the one or more processors assign an alphanumeric identifier, such as alphanumeric3, to the music and stores the alphanumeric identifier in the one or more memory devices of the computing device system.

As another example, during the display of the scene 104, the one or more processors of the computing device system identify one or more virtual gestures, such as facial expressions or body language, or a combination thereof, of one or more virtual objects, such as the supporting character 116, or the large monster 118, or the main character 114, in the scene 104, that output the one or more sounds, and store the one or more virtual gestures in the one or more memory devices of the computing device system. In the example, the one or more processors assign an identifier, such as gesture 1, to the one or more virtual gestures performed by a virtual object in the scene 104, and store the identifier in the one or more memory devices of the computing device system.

As yet another example, during the display of the scene 104, the one or more processors of the computing device system identify a location, such as a position and an orientation, of a virtual object in the scene 104 relative to the reference object, such as the main character 114, in the scene 104, and store the location in the one or more memory devices of the computing device system. In the example, the one or more processors assign an identifier location 1 to the location of the virtual object, and stores the identifier in the one or more memory devices of the computing device system.

As another example, during the display of the scene 104, the one or more processors of the computing device system identify an amplitude, such as a magnitude, of sound that is output from a virtual object in the scene 104, and store the amplitude in the one or more memory devices of the computing device system. Also, in the example, the one or more processors assign an amplitude identifier, such as amplitude 1, to the amplitude of sound and stores the amplitude identifier in the one or more memory devices of the computing device system. As another example, during the display of the scene 104, the one or more processors of the computing device system identify an amplitude of sound of music output with a display of the scene 104, and store the amplitude in the one or more memory devices of the computing device system. Also, in the example, the one or more processors assign an amplitude identifier, such as amplitude 2, to the amplitude of music and stores the amplitude identifier in the one or more memory devices of the computing device system. As yet another example, during the display of the scene 104, the one or more processors of the computing device system identify a Foley sound, such as a sudden noise or a sudden sound, that is output with a display of the scene 104, and store audio data output as the Foley sound within the one or more memory devices of the computing device system. In the example, the one or more processors assign an identifier, such as Foley 1, to the audio data output as the Foley sound, and store the identifier in the one or more memory devices.

As yet another example, during the display of the scene 104, the one or more processors of the computing device system identify a speech, such as an utterance of words, that is output with a display of the scene 104, and store audio data output as the speech within the one or more memory devices of the computing device system. In the example, the one or more processors assign an identifier, such as speech 1, to the audio data output as the speech, and store the identifier in the one or more memory devices.

As yet another example, during the display of the scene 104, the one or more processors of the computing device system identify music, such as musical notes or a musical soundtrack, that is output with a display of the scene 104, and store audio data output as the music within the one or more memory devices of the computing device system. In the example, the one or more processors assign an identifier, such as music 1, to the audio data output as the music, and store the identifier in the one or more memory devices.

As still another example, during the display of the scene 104, the one or more processors of the computing device system identify an ambience sound that is output with a display of the scene 104, and store audio data output as the ambience sound within the one or more memory devices of the computing device system. In the example, the one or more processors assign an identifier, such as ambience 1, to the audio data output as the ambience sound, and store the identifier in the one or more memory devices.

The metadata processor 616 accesses the state data 1016 from the one or more memory devices of the computing device system and parses the state data 1016 to distinguish among a first set having source data identifying the sources of sounds within the scene 104, a second set having virtual gesture data including the one or more virtual gestures of the one or more virtual objects in the scene 104, a third set having direction data including locations of the one or more virtual objects with respect to the reference object in the scene 104, and a fourth set having audio data including the alphanumeric characters and amplitudes identifying the sounds output within the scene 104. For example, upon determining that data within the one or more memory devices has the identifiers source 1 and source 2, the one or more processors determine that the data is the source data. In the example, upon determining that data within the one or more memory devices has the identifier gesture 1, the one or more processors determine that the data is the gesture data. Further, in the example, upon determining that data within the one or more memory devices has the identifier location 1, the one or more processors determine that the data is the direction data. In the example, upon determining that data within the one or more memory devices has the identifier alphanumeric 1 or the identifiers amplitude 1 and speech 1, the one or more processors determine that the data is the audio data of the speech. In the example, upon determining that data within the one or more memory devices has the identifier amplitude 1 and Foley 1, the one or more processors determine that the data is the audio data of the Foley sound. Further, in the example, upon determining that data within the one or more memory devices has the identifiers amplitude 1 and music 1, the one or more processors determine that the data is the audio data of the music. Also, in the example, upon determining that data within the one or more memory devices has the identifiers amplitude 1 and ambience 1, the one or more processors determine that the data is the audio data of the ambient sound.

The direction data includes an identification of a speaker, such as a right speaker or a left speaker, of the display device 108 that outputs a sound. For example, the one or more processors of the computing device system sends a request to the processor of the audio system of a display device, such as the display device 108 or 152 (FIGS. 1A and 1B) to identify the speaker that is outputting a sound with the scene 104. In the example, upon receiving the request, the processor of the audio system provides the identification of the speaker, such as the left speaker or the right speaker, to the one or more processors of the computing device system. In the example, upon receiving the identification, the one or more processors of the computing device system identify the speaker that outputs the sound.

The metadata processor 616 provides the first set of source data to the source labeler 1004, the second set of virtual gesture data and the audio data to the emotion data labeler 1018, the third set of direction data to the direction labeler 1006, and the fourth set of audio data to the audio data labeler 1008. The source labeler 1004 identifies each source of the source data to label the source in the scene 104. For example, the source labeler 1004 determines that the source 1 identifies the supporting character 116 and the source 2 identifies the large monster 118 to output source label data.

Moreover, the emotion data labeler 1018 determines an emotion of a source in the scene 104 from the virtual gesture data, or the audio data, or a combination thereof to output emotion label data for the scene 104. For example, the emotion data labeler 1018 compares the virtual gesture data of the supporting character 116 with predetermined gesture data identifying fear, and determines that the virtual gesture data is similar to or matches the predetermined gesture data to further determine that the virtual gesture data indicates fear. The indication of fear is an example of the emotion label data. As another example, the emotion data labeler 1018 compares the virtual gesture data of the large monster 118 with predetermined gesture data identifying anger, and determines that the virtual gesture data is similar to or matches the predetermined gesture data to further determine that the virtual gesture data indicates anger. The indication of anger is an example of the emotion label data.

Also, the direction labeler 1006 receives the direction data from the metadata processor 1003 and determines a direction of output of each sound with the scene 104 to provide direction label data. For example, the direction labeler 1006 determines that the supporting character 116 that utters the words, "Monster behind you!", is to the right of the main character 114. To illustrate, the direction labeler 1006 identifies that a co-ordinate of the reference object is (0, 0, 0) in the scene 104 and a co-ordinate of the supporting character 116 is (3, 0, 0). In the illustration, the co-ordinates (0, 0, 0) and (3, 0, 0) are locations of the main character 114 and the supporting character 116, respectively. In the illustration, the direction labeler 1006 determines that the supporting character 116 is 3 units along an x-axis in the scene 104 to further determine that the supporting character 116 is to the right of the reference object. The co-ordinate (3, 0, 0) is an example of the direction label data. As another example, the direction labeler 1006 determines that the large monster 118 that utters the words, "I found you!", is to the lower left of the main character 114. To illustrate, the direction labeler 1006 identifies that the co-ordinate of the reference object is (0, 0, 0) in the scene 104 and a co-ordinate of the large monster 118 is (−5, −3, 0). In the illustration, the co-ordinates (0, 0, 0) and (−5, −3, 0) are locations of the main character 114 and the large monster 118, respectively. In the illustration, the direction labeler 1006 determines that the large monster 118 is 5 units along the x-axis in the scene 104 and is 3 units along a y-axis in the scene 104 to further determine that the large monster 118 is to the lower left of the reference object. The co-ordinate (−5, −3, 0) is an example of the direction label data. As another example, the direction labeler 1006 determines that a sound is output by the support character 116 from the right speaker to determine that the sound is output from the right of the main character 114.

The direction labeler 1006 provides the direction label data to the direction classifier 1010 to output classified direction data. The direction classifier 1010 determines a distance of sound emitted from a source of the sound in the scene 104, based on the direction label data. For example, the direction classifier 1010 determines, from the locations of the supporting character 116 and the reference object, that a distance between the supporting character 116 and the reference object along the x-axis is less than a distance between the large monster 118 and the reference object along the x-axis to determine that the supporting character 116 is closer to the reference object than the large monster 118. The closeness of the distance is an example of the classified direction data. As another example, the direction classifier 1010 determines that an amplitude of the sound output from the large monster 118 is lower than an amplitude of the sound output from the supporting character 116 to determine that the large monster 118 is further away from the main character 114 compared to the large monster 118.

Moreover, the audio data labeler 1008 receives the fourth set of audio data from the metadata processor 1003 and determines that audio data based on which a sound is output by a virtual object or music within each of the scene 104 is either alphanumeric characters, such as words or numbers or speech, punctuation marks, or music, such as musical notes, or the ambient sound or the Foley sound to output audio label data. For example, the audio data labeler 1008 determines that the terms, "Monster behind you!" are words and a punctuation mark, and further determines a meaning of the terms. To illustrate, the audio data labeler 1008 accesses an online web-based dictionary to determine the meaning. In the illustration, the on-line web-based dictionary includes synonyms of the terms. In the example, the words, the punctuation mark, and the meaning of the terms are examples of the audio label data. As another example, the audio data labeler 1008 determines words of the musical soundtrack by comparing the words to prestored words. In the example, the audio data labeler 1008 compares notes of the music or of the ambient sound or of the Foley sound with predetermined notes to identify the notes. In the example, when the notes match the predetermined notes, the notes are labeled, such as identified. The words of the musical soundtrack or the speech and the notes are examples of the audio label data. The audio data labeler 1008 provides the audio label data to the audio data classifier 1012. As an example, the audio label data includes the audio data received from the metadata processor 1003 by the audio data labeler 1008.

In addition, the audio data classifier 1012 classifies the audio label data to output classified audio data. For example, the audio data classifier 1012 compares an amplitude of the words or sounds uttered by a virtual object of the scene 104 or the music output with the scene 104 with a predetermined amplitude to determine whether the amplitude exceeds the predetermined amplitude. In the example, upon determining that the amplitude exceeds the predetermined amplitude, the audio data classifier 1012 classifies the amplitude as high. On the other hand, upon determining that the amplitude does not the predetermined amplitude, the audio data classifier 1012 classifies the amplitude as low. As another example, the audio data classifier 1012 applies Fourier transform to the audio label data to determine a frequency of the audio label data. To illustrate, the audio data classifier 1012 applies fast Fourier transform to the notes or to sounds or to utterance of words to determine a frequency of occurrence of the notes or the sounds or the utterance of words. In the illustration, an example of frequency of the notes is beats per minute (BPM). In the example, the audio data classifier 1012 further compares the frequency with a predetermined frequency to determine that the frequency exceeds the predetermined frequency or is below the predetermined frequency. Upon determining that the frequency exceeds the predetermined frequency, the audio data classifier 1012 classifies the frequency as high. On the other hand, upon determining that the frequency does not exceed the predetermined frequency, the audio data classifier 1012 classifies the frequency as low. The high amplitude, the low amplitude, the high frequency, and the low frequency are examples of the classified audio data. To illustrate, the high frequency of breathing of the large monster 118 indicates heavy breathing by the virtual monster 118 to indicate that the large monster 118 is about to die. As another illustration, the low frequency, such as zero frequency, indicates a death of the large monster 118.

The audio data classifier 1012 provides the classified audio data to the emotion data labeler 1018. In addition to or instead of the virtual gesture data, the emotion data labeler 1018 applies the classified audio data to output the emotion label data. For example, upon determining that the words, "Monster behind you" are uttered with the high amplitude and the high frequency, the audio data classifier 1012 determines that the words are uttered to express fear. As another example, upon determining that the words, "Monster behind you" are uttered with the low amplitude and the low frequency, the audio data classifier 1012 determines that the words are uttered to express sadness. As yet another example, upon determining that the notes have the high amplitude and the high frequency, the audio data classifier 1012 determines that the musical notes indicate fear. The indications of fear and sadness are examples of the emotion label data.

The source labeler 1004 provides the source label data to the graphics model 1014, the direction labeler 1006 provides the direction label data to the graphics model 1014, the direction classifier 1010 provides the classified direction data to the graphics model 1014, the audio data labeler 1008 provides the audio label data to the graphics model 1014, the audio data classifier 1012 provides the classified audio data to the graphics model 1014, and the emotion data labeler 1018 provides the emotion label data to the graphics model 1014. In addition, the graphics model 1014 receives a profile, such as the profile 1 or 2, of a user, such as the user 1 or 2.

The graphics model 1014 generates the graphical output 1002 based on one or more of the source label data, the emotion label data, the direction label data, the classified direction data, the audio label data, the classified audio data, and the profile. For example, the graphics model 1014 generates display data according to the preference within the profile 1 of the user 1. To illustrate, the display data is generated in Spanish based on the preference within the profile 1. As another example, the graphics model 1014 generates display data of the emotion identifier 156 (FIG. 1B) upon receiving the emotion label data indicating that the supporting character 114 utters the words "Monster behind you!" out of fear. In the example, the display data is generated according to the preference accessed from the profile 2 of the user 2 by the one or more processors of the computing device system. In the example, upon determining that the preference indicates that the user 2 is hearing impaired, the graphics model 1014 does not include the words, "Monster behind you!" next to the emotion identifier 156.

As another example, the graphics model 1014 determines whether two or more display devices, such as the display devices 108 and 152 are coupled to the one or more processors of the computing device system. In the example, upon determining that the two or more display devices are coupled, the graphics model 1014 determines to display the subtitle 102 on one of the two display devices and the information associated with the scene 104 on another one of the two display devices. In the example, the graphics model 1014 generates display data of the source indicator 206 (FIG. 2) to identify the source of the sound output by the supporting character 116 upon receiving the source label data indicating that the source label data indicating that the words, "Monster behind you!" are output by the supporting character 116. Further, in the example, the graphics model 1014 generates display data of the emotion identifier 208 (FIG. 2) upon receiving the emotion label data indicating that the supporting character 114 utters the words "Monster behind you!" out of fear. In the example, the graphics model 1014 generates display data of the emotion identifier 210 (FIG. 2) upon receiving the emotion label data indicating that the large monster 118 utters the words "I found you!" out of anger. Also, in the example, the graphics model 1014 generates display data of an emotion identifier upon receiving the emotion label data indicating that the trees 110 (FIG. 1A) utter a sound indicating fear. Furthermore, in the example, the graphics model 1014 generates display data of an emotion identifier 210 upon receiving the emotion label data indicating that the music expresses fear.

As yet another example, the graphics model 1014 generates the display data of the source indicator 206 for displaying the source indicator 206 in 3D as the source indicator 302 (FIG. 3). In the example, the graphics model 1014 generates the display data of the emotion identifier 208 for displaying the emotion identifier 208 in 3D as the emotion identifier 304 (FIG. 3). Also in the example, the graphics model 1014 generates the display data of the emotion identifier 210 for displaying the emotion identifier 210 in 3D as the emotion identifier 306 (FIG. 3).

As yet another example, the graphics model 1014 generates display data of the direction identifier 402 (FIG. 4A) upon receiving the direction label data indicating the direction of the supporting character 116 with respect to the reference object. In the example, the graphics model 1014 generates display data of the direction identifier 404 (FIG. 4A) upon receiving the direction label data indicating the direction of the large monster 118 with respect to the reference object.

As another example, the graphics model 1014 generates display data of the direction and noise identifier 460 (FIG. 4B) upon receiving the direction label data indicating the direction of the large monster 118 with respect to the reference object. In addition, the graphics model 1014 determines an amount of noise interfering with or a virtual object obstructing a sound output from the large monster 118. In the example, the noise includes one or more sounds that are not uttered by the large monster 118 and the virtual object includes a virtual canyon wall or a virtual mountain. In the example, the graphics model 1014 determines that the virtual object obstructs the sound based on game data displaying the virtual objects in the scene 104. In the example, the game data is received from a game server of the computing device system. To illustrate, the noise includes a sound that is output from the virtual background of the scene 104. In the illustration, the amount of noise includes an amplitude of the sound output from the virtual background. Also, in the illustration, the one or more processors of the computing device system identify the noise as having one or more frequencies different from one or more frequencies of the sound uttered by the large monster 118. In the illustration, the one or more processors of the computing device generate display data to display the disturbance portion 460 based on the amplitude of the noise. To further illustrate, the greater the amplitude of the noise, the larger the size of the disturbance portion 460 and the lower the amplitude of the noise, the smaller the size of the disturbance portion 460.

As yet another example, the graphics model 1014 generates display data of the single direction identifier 502 (FIG. 5) from the direction label data indicating directions of sounds output with the scene 104, such as by the supporting character 116 and the large monster 118.

As another example, the graphics model 1014 generates display data for displaying the wheel 602 (FIG. 6) based on the frequencies of sound that is output with the scene 104, such as from the supporting character 114 or the large monster 118. To illustrate, as the frequencies of sound output from the supporting character 114 increases, the graphics model 1014 highlights each respective segment of the wheel 602 in a circular fashion.

As yet another example, the graphics model 1014 generates display data for displaying the rows 702 and 704 (FIG. 7) based on the frequencies of sound that is output with the scene 104, such as from the supporting character 114 or the large monster 118. To illustrate, as the frequencies of sound output from the supporting character 114 increases, the graphics model 1014 highlights each respective segment of the row 702 from left to right in a linear fashion and when the frequencies reach twice the frequency represented by the leftmost segment of the row 702, the graphics model 1014 highlights the leftmost segment of the row 704.

As still another example, the graphics model 1014 generates display data for displaying the curved representation 802 based on the frequencies of sound that is output with the scene 104, such as from the supporting character 114 or the large monster 118. To illustrate, as the frequencies of sound output from the supporting character 114 increases, the graphics model 1014 highlights each respective segment of the inner curved portion 806 from left to right in a circular fashion and when the frequencies reach twice the frequency represented by the segment 804 (FIG. 8), the graphics model 1014 highlights the segment 808 of the outer curved portion 810 (FIG. 8).

As another example, the graphics model 1014 generates display data for displaying the musical instrument 902 and the row 904 (FIG. 9) based on frequencies and amplitudes of sound output with the scene 104. To illustrate, the graphics model 1014 determines based on the frequencies and amplitudes of sound of music that is output with the scene 104 that the guitar is a musical instrument used to generate the music. In the illustration, upon determining so, the graphics model 1014 generates the display data for displaying the musical instrument 902. Further, in the illustration, the graphics model 1014 determines the musical parameters 1a and 2a from the frequencies and amplitudes of the sound of the guitar in the music, and generates the display data having the row 904. Also, in the illustration, the graphics model 1014 highlights each segment of the row 904 to represent output of the musical parameters 1a and 2a with the scene 104. To further illustrate, upon determining that the frequencies and amplitudes of sound output by the guitar indicates the musical parameter 1a, the graphics model 1014 highlights the leftmost segment in the row 904 and upon determining that the frequencies and amplitudes of sound output by the guitar indicates the musical parameter 2a, the graphics model 1014 highlights the segment next to the leftmost segment in the row 904.

As yet another example, the graphics model 1014 generates display data for a symbolic depiction of audio information, such as one or more amplitudes and one or more frequencies that are output with the scene. For example, the graphics model 1014 generates display data for displaying an icon or a symbol or a waveform symbol to depict the one or more amplitudes and one or more frequencies generated from the sound of heavy breathing by the large monster 118.

As another example, the graphics model 1014 generates display data for identifying the Foley sound based on the identifier Foley 1 received from the audio data. In the example, the display data includes an alphanumeric identifier, such as Foley, or a symbol or an icon or an animation indicating that the sound is the Foley sound. As yet another example, the graphics model 1014 generates display data for identifying the ambient sound based on the identifier ambience 1 received from the audio data. In the example, the display data includes an alphanumeric identifier, such as Ambience, or a symbol or an icon or an animation indicating that the sound is the ambient sound.

The graphics model 1014 determines locations, with respect to the scene, at which the graphical output 1002 is to be displayed. For example, the graphics model 1014 determines that the source indicator 206 is to be displayed within the display area 204 (FIG. 2) below the scene 104. Moreover, in the example, the graphics model 1014 determines that the source indicator 206 is to be displayed next to, e.g., to the left of, the words, "Monster behind you?". As another example, the graphics model 1014 determines that the emotion identifiers 208 and 210 are to be displayed within the display area 204 below the scene 104. As yet another example, the graphics model 1014 determines that the direction identifiers 402 and 404 are to be displayed within the display area 410 (FIG. 4) below the scene 104. Examples of the locations of the graphical output 1002 includes positions and orientations of the graphical output 1002.

In an operation 1050, it is determined whether the volumes of sounds output with the scene 104 are less than the predetermined threshold or whether a profile of a user, such as the profile 1 of the user 1 or the profile 2 of the user 2, indicates that the user is hearing impaired or whether the profile indicates that the user prefers to view the sub-title 102 in a language or a combination thereof. Upon determining, in the operation 1050, that the volumes of sounds output with a scene, such as the scene 104 are less than the predetermined threshold or that the profile indicates that the user is hearing impaired or the profile indicates that the user prefers to view the sub-title 102 in the language or a combination thereof, the processor of the computing device system accesses, such as reads, the graphical output 1002 generated based on the scene from the one or more memory devices of the computing device system. In an operation 1052, upon accessing the graphical output 1002, the processor of the computing device system provides the graphical output 1002 to the display device 152 (FIG. 1B) for display of the graphical output 1002 with the scene 104. For example, the processor of the computing device system sends an instruction to a processor of the display device 152 to display the emotion identifier 156 (FIG. 1B) within a predetermined amount of time after utterance of the words, "Monster behind you!" by the supporting character 116 (FIG. 1B). In the example, the predetermined amount of time is a time before a display of a next scene that immediately follows the scene 104. In the example, the next scene is displayed consecutive to the scene 104. As another example, the processor of the computing device system sends an instruction to a processor of the display device 108 to display the source indicator 206 and the emotion identifier 208 within a predetermined amount of time after utterance of the words, "Monster behind you!" by the supporting character 116 (FIG. 2). In the example, the predetermined amount of time is a time before a display of the next scene.

On the other hand, upon determining, in the operation 1050, that the volumes of sound output with the scene is not less than the predetermined threshold and that the profile indicates that the user is not hearing impaired and that the profile indicates that the user does not prefer to view the sub-title 102 in the language, in an operation 1054, the processor of the computing device system does not access the graphical output 1002 from the one or more memory devices of the computing device system and does not provide the graphical output 1002 for display on the display device 108.

In one embodiment, the graphics model 1014 determines that that a scene (not shown) similar to the scene 104 is being displayed on a display device, such as the display device 108 or another display device, operated by the user 1 or a user other than the user 1. For example, the graphics model 1014 determines whether the scene (not shown) has similar characters or similar virtual objects or a similar virtual background or similar sounds or a combination thereof as that of the scene 104. To illustrate, the graphics model 1014 determines whether the scene (not shown) has the same characters, or the same objects, such as virtual objects, or the same sounds or a combination thereof as that of the scene 104. In the example, upon determining so, the graphics model 1014 determines to apply the graphical output 1002 determined from the scene 104 to the scene (not shown). To illustrate, the graphical model 614 overlays the display data generated by the graphical model 614 based on the scene 104. In the illustration, the display data is overlaid on the scene (not shown). On the other hand, upon determining that the scene (not shown) is not similar to the scene 104, the graphics model 1014 determines not to apply the graphical output 1002 generated based on the scene 104 to the scene (not shown).

Figure 11A:
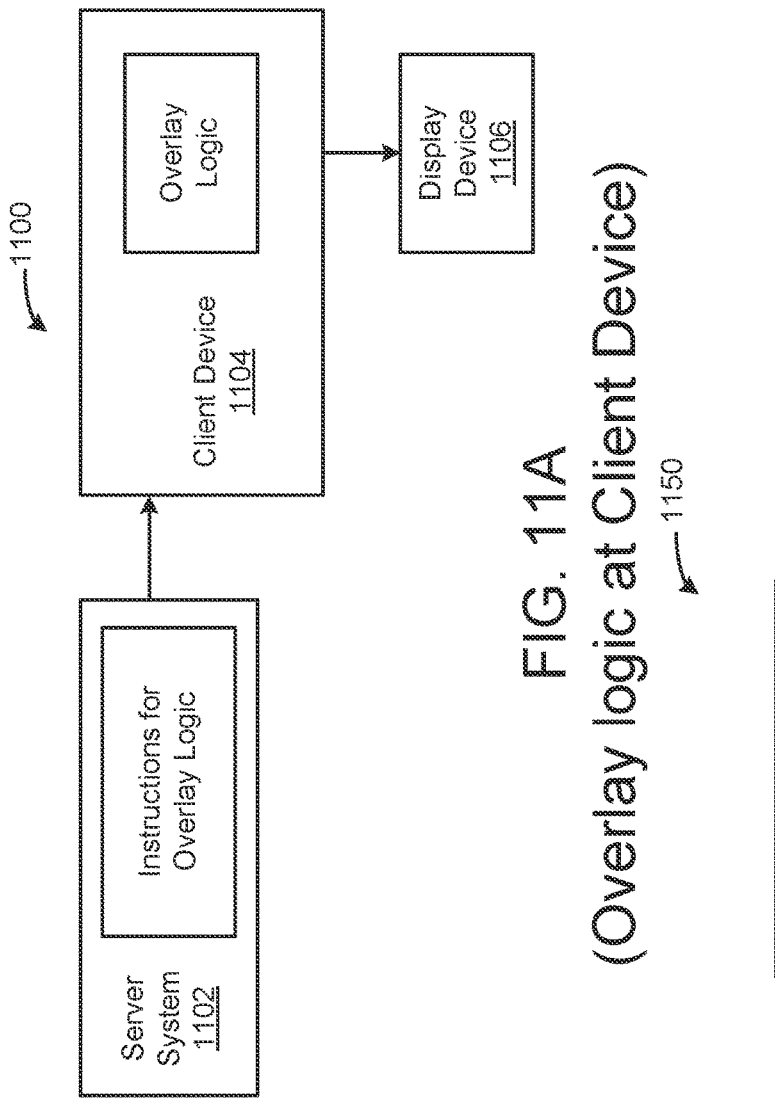
FIG. 11A is a diagram of an embodiment of a system to illustrate instructions for overlay logic that is stored on a client device.

FIG. 11A is a diagram of an embodiment of a system 1100 to illustrate instructions for overlay logic that is stored on a client device, such as the computer or the game console or the television or the smart television or the smartphone. The system 1100 includes a server system 1102, a client device 1104, and a display device 1106, such as the display device 1104 or 152 (FIGS. 1A and 1B). The server system 1102 is an example of the computing device system. The server system 1102 includes one or more servers that are coupled to the client device 1104 via a computer network, such as the Internet or an Intranet or a combination thereof. The client device 1104 is coupled to the display device 1106.

The client device 1104 includes the overlay logic. For example, the overlay logic includes a rendering operation stored in a memory device of the client device 1104. In the example, the graphical output 1002 (FIG. 10) generated based on a scene is overlaid on the scene when the overlay logic is executed.

The one or more processors of the server system 1102 generate the graphical output 1002 and the instructions for display of the graphical output 1002, and send the instructions with the graphical output 1002 to the overlay logic for overlaying the graphical output 1002 on a scene, such as the scene 104 (FIG. 1A), based on which the graphical output 1002 is generated. As an example, the instructions for displaying the graphical output 1002 include the locations, such as positions and orientations, of display of the display data of the graphical output 1002 with respect to the scene. The server system 1102 sends the instructions via the computer network to the overlay logic on the client device 1104.

Upon receiving the instructions, a processor, such as a central processing unit (CPU), or a combination thereof, of the client device 1104 executes the overlay logic to control the display device 108 for overlaying the graphical output 1002 on the scene at the locations received within the instructions. For example, the processor of the client device 1104 instructs a GPU of the display device 1106 to render the graphical output 1002 to generate images from the display data of the graphical output 1002 at the locations received within the instructions. To illustrate, the images representing the graphical output are rendered by the GPU of the display device 1106 as overlay on images of the scene 104 at the locations received within the instructions.

In an embodiment, the display device 1106 is integrated within the client device 1104. For example, the display device 1106 is a part of the client device 1104.

Figure 11B:
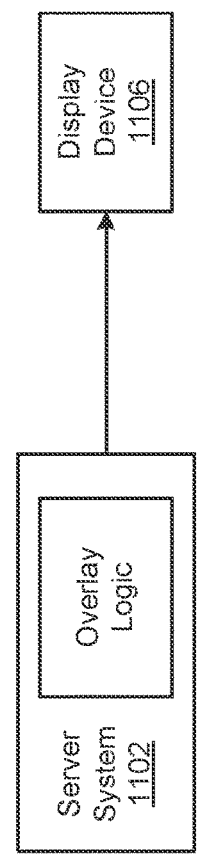
FIG. 11B is a diagram of an embodiment of a system to illustrate that the overlay logic is stored on a server system instead of the client device.

FIG. 11B is a diagram of an embodiment of a system 1150 to illustrate that the overlay logic is stored on the server system 1102 instead of the client device 1104. The system 1150 includes the server system 1102 and the display device 1106. The server system 1102 includes the overlay logic. For example, the overlay logic is stored in a memory device of the server system 1102.

The one or more processors of the server system 1102 execute the overlay logic to generate image frames from the display data of the graphical output 1002 (FIG. 10). For example, the one or more processors of the server system 1102 receive a first set of image frames of the scene 104 from remaining of the one or more processors of the server system 102 or from another server system, generate a second set of image frames from the display data of the graphical output 1002 based on the scene, and overlay the second set on the first set to output a third set of image frames.

The image frames, such as the third set of image frames, include the display data of the graphical output 1002 overlaid at one or more locations with respect to the scene.

Moreover, the image frames, such as the third set of image frames, include graphical parameters, such as colors and intensities, assigned to the display data by the one or more processors of the server system 1102. The image frames, such as the third set of image frames, are encoded by the one or more processors of the server system 1102 to output encoded image frames and the encoded image frames are sent from the server system 1102 via the computer network to the display device 1106. The display device 1106 decodes the encoded image frames to output unencoded image frames and displays the unencoded image frames on the display screen of the display device 1106 to overlay the graphical output 1002 on images of a scene based on which the graphical output 1002 is generated.

In an embodiment, in which the audio-only programming is used, instead of the image frames of the scene, audio frames of the scene are used by the one or more processors of the computing device system and instead of overlaying the images of the display data of the graphical output 1002 on the image frames of the scene, the images of the display data of the graphical output 1002 are displayed synchronous with the output of the audio frames of the scene. For example, the one or more processors of the computing device system synchronize output of the display data of the graphical output 1002 generated based on the scene with the audio frames of the scene. To illustrate, the source indicator 206 (FIG. 2) is displayed on the display device 1106 immediately after an audio output of the words, "Monster behind you!" by the one or more speakers of the display device 1106 or one or more speakers of another client device. In the example, the audio frames are received by the one or more processors of the computing device system from remaining ones of the one or more processors of the computing device system or from another server system.

Figure 12:
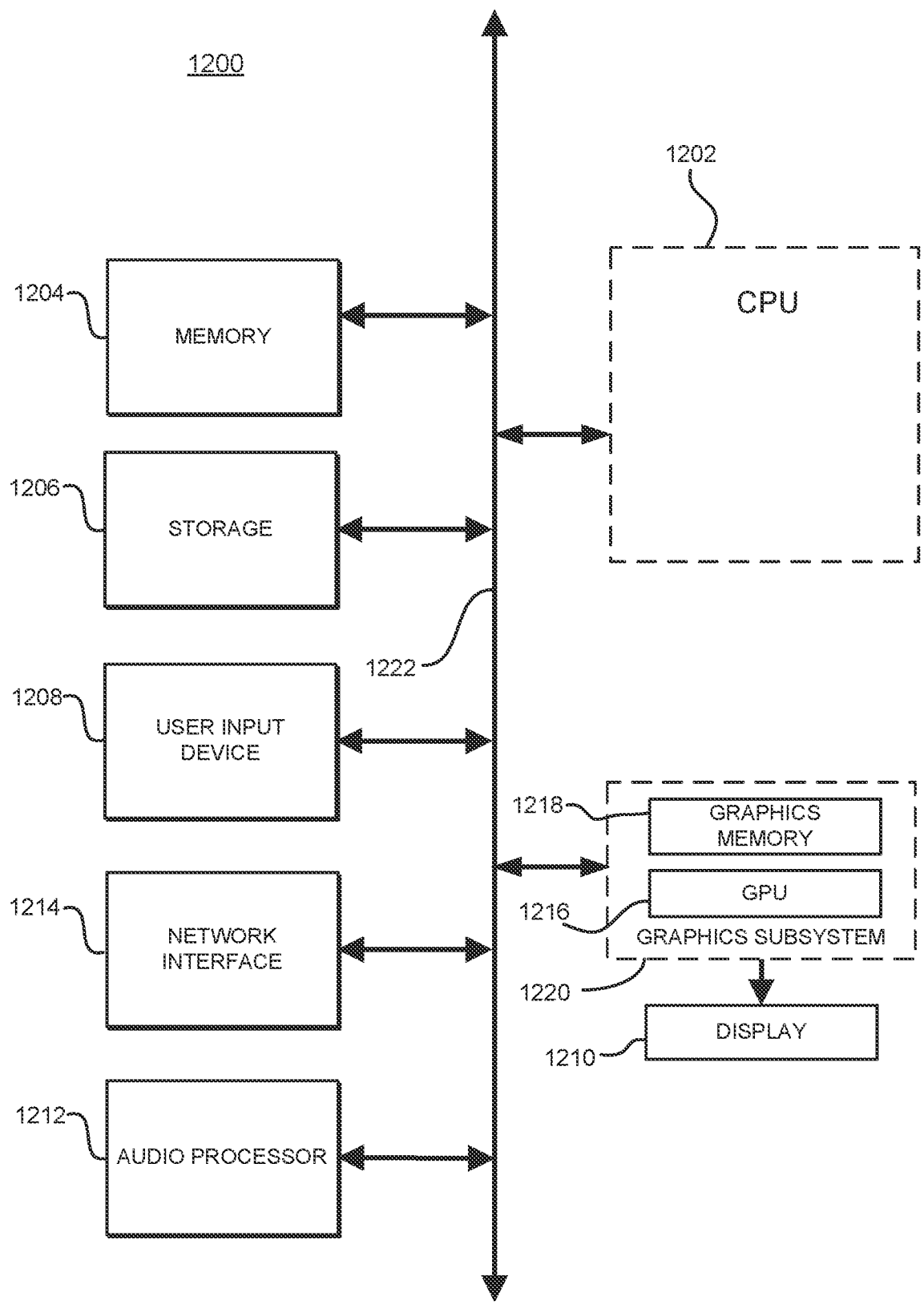
FIG. 12 illustrates components of an example device that can be used to perform aspects of the various embodiments of the present disclosure.

FIG. 12 illustrates components of an example device 1200 that can be used to perform aspects of the various embodiments of the present disclosure. This block diagram illustrates the device 1200 that can incorporate or can be a personal computer, video game console, personal digital assistant, a server or other digital device, suitable for practicing an embodiment of the disclosure. The device 1200 includes a CPU 1202 for running software applications and optionally an operating system. The CPU 1202 includes one or more homogeneous or heterogeneous processing cores. For example, the CPU 1202 is one or more general-purpose microprocessors having one or more processing cores. Further embodiments can be implemented using one or more CPUs with microprocessor architectures specifically adapted for highly parallel and computationally intensive applications, such as processing operations of interpreting a query, identifying contextually relevant resources, and implementing and rendering the contextually relevant resources in a video game immediately. The device 1200 can be a localized to a player playing a game segment (e.g., game console), or remote from the player (e.g., back-end server processor), or one of many servers using virtualization in a game cloud system for remote streaming of gameplay to clients.

A memory 1204 stores applications and data for use by the CPU 1202. A storage 1206 provides non-volatile storage and other computer readable media for applications and data and may include fixed disk drives, removable disk drives, flash memory devices, compact disc-ROM (CD-ROM), digital versatile disc-ROM (DVD-ROM), Blu-ray, high definition-DVD (HD-DVD), or other optical storage devices, as well as signal transmission and storage media. User input devices 1208 communicate user inputs from one or more users to the device 1200. Examples of the user input devices 1208 include keyboards, mouse, joysticks, touch pads, touch screens, still or video recorders/cameras, tracking devices for recognizing gestures, and/or microphones. A network interface 1214 allows the device 1200 to communicate with other computer systems via an electronic communications network, and may include wired or wireless communication over local area networks and wide area networks, such as the internet. An audio processor 1212 is adapted to generate analog or digital audio output from instructions and/or data provided by the CPU 1202, the memory 1204, and/or data storage 1206. The components of device 1200, including the CPU 1202, the memory 1204, the data storage 1206, the user input devices 1208, the network interface 1210, and an audio processor 1212 are connected via a data bus 1222.

A graphics subsystem 1220 is further connected with the data bus 1222 and the components of the device 1200. The graphics subsystem 1220 includes a graphics processing unit (GPU) 1216 and a graphics memory 1218. The graphics memory 1218 includes a display memory (e.g., a frame buffer) used for storing pixel data for each pixel of an output image. The graphics memory 1218 can be integrated in the same device as the GPU 1216, connected as a separate device with the GPU 1216, and/or implemented within the memory 1204. Pixel data can be provided to the graphics memory 1218 directly from the CPU 1202. Alternatively, the CPU 1202 provides the GPU 1216 with data and/or instructions defining the desired output images, from which the GPU 1216 generates the pixel data of one or more output images. The data and/or instructions defining the desired output images can be stored in the memory 1204 and/or the graphics memory 1218. In an embodiment, the GPU 1216 includes three-dimensional (3D) rendering capabilities for generating pixel data for output images from instructions and data defining the geometry, lighting, shading, texturing, motion, and/or camera parameters for a scene. The GPU 1216 can further include one or more programmable execution units capable of executing shader programs.

The graphics subsystem 1214 periodically outputs pixel data for an image from the graphics memory 1218 to be displayed on the display device 1210. The display device 1210 can be any device capable of displaying visual information in response to a signal from the device 1200, including a cathode ray tube (CRT) display, a liquid crystal display (LCD), a plasma display, and an organic light emitting diode (OLED) display. The device 1200 can provide the display device 1210 with an analog or digital signal, for example.

It should be noted, that access services, such as providing access to games of the current embodiments, delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided into different services, such as Infrastructure as a Service (IaaS), Platform as a Service (PaaS), and Software as a Service (SaaS). Cloud computing services often provide common applications, such as video games, online that are accessed from a web browser, while the software and data are stored on the servers in the cloud. The term cloud is used as a metaphor for the Internet, based on how the Internet is depicted in computer network diagrams and is an abstraction for the complex infrastructure it conceals.

A game server may be used to perform the operations of the durational information platform for video game players, in some embodiments. Most video games played over the Internet operate via a connection to the game server. Typically, games use a dedicated server application that collects data from players and distributes it to other players. In other embodiments, the video game may be executed by a distributed game engine. In these embodiments, the distributed game engine may be executed on a plurality of processing entities (PEs) such that each PE executes a functional segment of a given game engine that the video game runs on. Each processing entity is seen by the game engine as simply a compute node. Game engines typically perform an array of functionally diverse operations to execute a video game application along with additional services that a user experiences. For example, game engines implement game logic, perform game calculations, physics, geometry transformations, rendering, lighting, shading, audio, as well as additional in-game or game-related services. Additional services may include, for example, messaging, social utilities, audio communication, game play replay functions, help function, etc. While game engines may sometimes be executed on an operating system virtualized by a hypervisor of a particular server, in other embodiments, the game engine itself is distributed among a plurality of processing entities, each of which may reside on different server units of a data center.

According to this embodiment, the respective processing entities for performing the operations may be a server unit, a virtual machine, or a container, depending on the needs of each game engine segment. For example, if a game engine segment is responsible for camera transformations, that particular game engine segment may be provisioned with a virtual machine associated with a GPU since it will be doing a large number of relatively simple mathematical operations (e.g., matrix transformations). Other game engine segments that require fewer but more complex operations may be provisioned with a processing entity associated with one or more higher power CPUs.

By distributing the game engine, the game engine is provided with elastic computing properties that are not bound by the capabilities of a physical server unit. Instead, the game engine, when needed, is provisioned with more or fewer compute nodes to meet the demands of the video game. From the perspective of the video game and a video game player, the game engine being distributed across multiple compute nodes is indistinguishable from a non-distributed game engine executed on a single processing entity, because a game engine manager or supervisor distributes the workload and integrates the results seamlessly to provide video game output components for the end user.

Users access the remote services with client devices, which include at least a CPU, a display and an input/output (I/O) interface. The client device can be a personal computer (PC), a mobile phone, a netbook, a personal digital assistant (PDA), etc. In one embodiment, the network executing on the game server recognizes the type of device used by the client and adjusts the communication method employed. In other cases, client devices use a standard communications method, such as html, to access the application on the game server over the internet. It should be appreciated that a given video game or gaming application may be developed for a specific platform and a specific associated controller device. However, when such a game is made available via a game cloud system as presented herein, the user may be accessing the video game with a different controller device. For example, a game might have been developed for a game console and its associated controller, whereas the user might be accessing a cloud-based version of the game from a personal computer utilizing a keyboard and mouse. In such a scenario, the input parameter configuration can define a mapping from inputs which can be generated by the user's available controller device (in this case, a keyboard and mouse) to inputs which are acceptable for the execution of the video game.

In another example, a user may access the cloud gaming system via a tablet computing device system, a touchscreen smartphone, or other touchscreen driven device. In this case, the client device and the controller device are integrated together in the same device, with inputs being provided by way of detected touchscreen inputs/gestures. For such a device, the input parameter configuration may define particular touchscreen inputs corresponding to game inputs for the video game. For example, buttons, a directional pad, or other types of input elements might be displayed or overlaid during running of the video game to indicate locations on the touchscreen that the user can touch to generate a game input. Gestures such as swipes in particular directions or specific touch motions may also be detected as game inputs. In one embodiment, a tutorial can be provided to the user indicating how to provide input via the touchscreen for gameplay, e.g., prior to beginning gameplay of the video game, so as to acclimate the user to the operation of the controls on the touchscreen.

In some embodiments, the client device serves as the connection point for a controller device. That is, the controller device communicates via a wireless or wired connection with the client device to transmit inputs from the controller device to the client device. The client device may in turn process these inputs and then transmit input data to the cloud game server via a network (e.g., accessed via a local networking device such as a router). However, in other embodiments, the controller can itself be a networked device, with the ability to communicate inputs directly via the network to the cloud game server, without being required to communicate such inputs through the client device first. For example, the controller might connect to a local networking device (such as the aforementioned router) to send to and receive data from the cloud game server. Thus, while the client device may still be required to receive video output from the cloud-based video game and render it on a local display, input latency can be reduced by allowing the controller to send inputs directly over the network to the cloud game server, bypassing the client device.

In one embodiment, a networked controller and client device can be configured to send certain types of inputs directly from the controller to the cloud game server, and other types of inputs via the client device. For example, inputs whose detection does not depend on any additional hardware or processing apart from the controller itself can be sent directly from the controller to the cloud game server via the network, bypassing the client device. Such inputs may include button inputs, joystick inputs, embedded motion detection inputs (e.g., accelerometer, magnetometer, gyroscope), etc. However, inputs that utilize additional hardware or require processing by the client device can be sent by the client device to the cloud game server. These might include captured video or audio from the game environment that may be processed by the client device before sending to the cloud game server. Additionally, inputs from motion detection hardware of the controller might be processed by the client device in conjunction with captured video to detect the position and motion of the controller, which would subsequently be communicated by the client device to the cloud game server. It should be appreciated that the controller device in accordance with various embodiments may also receive data (e.g., feedback data) from the client device or directly from the cloud gaming server.

In an embodiment, although the embodiments described herein apply to one or more games, the embodiments apply equally as well to multimedia contexts of one or more interactive spaces, such as a metaverse.

In one embodiment, the various technical examples can be implemented using a virtual environment via the HMD. The HMD can also be referred to as a virtual reality (VR) headset. As used herein, the term "virtual reality" (VR) generally refers to user interaction with a virtual space/environment that involves viewing the virtual space through the HMD (or a VR headset) in a manner that is responsive in real-time to the movements of the HMD (as controlled by the user) to provide the sensation to the user of being in the virtual space or the metaverse. For example, the user may see a three-dimensional (3D) view of the virtual space when facing in a given direction, and when the user turns to a side and thereby turns the HMD likewise, the view to that side in the virtual space is rendered on the HMD. The HMD can be worn in a manner similar to glasses, goggles, or a helmet, and is configured to display a video game or other metaverse content to the user. The HMD can provide a very immersive experience to the user by virtue of its provision of display mechanisms in close proximity to the user's eyes. Thus, the HMD can provide display regions to each of the user's eyes which occupy large portions or even the entirety of the field of view of the user, and may also provide viewing with three-dimensional depth and perspective.

In one embodiment, the HMD may include a gaze tracking camera that is configured to capture images of the eyes of the user while the user interacts with the VR scenes. The gaze information captured by the gaze tracking camera(s) may include information related to the gaze direction of the user and the specific virtual objects and content items in the VR scene that the user is focused on or is interested in interacting with. Accordingly, based on the gaze direction of the user, the system may detect specific virtual objects and content items that may be of potential focus to the user where the user has an interest in interacting and engaging with, e.g., game characters, game objects, game items, etc.

In some embodiments, the HMD may include an externally facing camera(s) that is configured to capture images of the real-world space of the user such as the body movements of the user and any real-world objects that may be located in the real-world space. In some embodiments, the images captured by the externally facing camera can be analyzed to determine the location/orientation of the real-world objects relative to the HMD. Using the known location/orientation of the HMD the real-world objects, and inertial sensor data from the, the gestures and movements of the user can be continuously monitored and tracked during the user's interaction with the VR scenes. For example, while interacting with the scenes in the game, the user may make various gestures such as pointing and walking toward a particular content item in the scene. In one embodiment, the gestures can be tracked and processed by the system to generate a prediction of interaction with the particular content item in the game scene. In some embodiments, machine learning may be used to facilitate or assist in said prediction.

During HMD use, various kinds of single-handed, as well as two-handed controllers can be used. In some implementations, the controllers themselves can be tracked by tracking lights included in the controllers, or tracking of shapes, sensors, and inertial data associated with the controllers. Using these various types of controllers, or even simply hand gestures that are made and captured by one or more cameras, it is possible to interface, control, maneuver, interact with, and participate in the virtual reality environment or metaverse rendered on the HMD. In some cases, the HMD can be wirelessly connected to a cloud computing and gaming system over a network. In one embodiment, the cloud computing and gaming system maintains and executes the video game being played by the user. In some embodiments, the cloud computing and gaming system is configured to receive inputs from the HMD and the interface objects over the network. The cloud computing and gaming system is configured to process the inputs to affect the game state of the executing video game. The output from the executing video game, such as video data, audio data, and haptic feedback data, is transmitted to the HMD and the interface objects. In other implementations, the HMD may communicate with the cloud computing and gaming system wirelessly through alternative mechanisms or channels such as a cellular network.

Additionally, though implementations in the present disclosure may be described with reference to a head-mounted display, it will be appreciated that in other implementations, non-head mounted displays may be substituted, including without limitation, portable device screens (e.g. tablet, smartphone, laptop, etc.) or any other type of display that can be configured to render video and/or provide for display of an interactive scene or virtual environment in accordance with the present implementations. It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

Although the method operations were described in a specific order, it should be understood that other housekeeping operations may be performed in between operations, or operations may be adjusted so that they occur at slightly different times or may be distributed in a system which allows the occurrence of the processing operations at various intervals associated with the processing, as long as the processing of the telemetry and game state data for generating modified game states and are performed in the desired way.

One or more embodiments can also be fabricated as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

In one embodiment, the video game is executed either locally on a gaming machine, a personal computer, or on a server. In some cases, the video game is executed by one or more servers of a data center. When the video game is executed, some instances of the video game may be a simulation of the video game. For example, the video game may be executed by an environment or server that generates a simulation of the video game. The simulation, on some embodiments, is an instance of the video game. In other embodiments, the simulation may be produced by an emulator. In either case, if the video game is represented as a simulation, that simulation is capable of being executed to render interactive content that can be interactively streamed, executed, and/or controlled by user input.

It should be noted that in various embodiments, one or more features of some embodiments described herein are combined with one or more features of one or more of remaining embodiments described herein.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

The invention claimed is:

1. A method comprising:
comparing a plurality of sound volumes output from a scene with a volume of a real-world environment, wherein the scene is displayed on a display device located in the real-world environment;
accessing a first user profile within a first user account;
accessing display data based on one of the plurality of sound volumes upon accessing the first user profile;
accessing a direction identifier providing a directionality, within the scene, of one of the plurality of sound volumes in response to determining that the plurality of sound volumes output from the scene is lower than the volume of the real-world environment; and
sending the direction identifier for display on the display device to indicate the directionality of the one of the plurality of sound volumes within the scene and providing at least part of the display data for display in a language determined based on the first user profile.

2. The method of claim 1, wherein said comparing occurs to determine that the plurality of sound volumes output via the first user account are below a pre-determined threshold, wherein the pre-determined threshold is the volume of the real-world environment, the method comprising:
accessing a second user profile within a second user account;
accessing an identifier of an emotion conveyed by the one of the plurality of sound volumes upon determining that the plurality of sound volumes are below the pre-determined threshold, wherein the emotion is conveyed by a virtual object outputting the one of the plurality of sound volumes in the scene;
determining, based on the second user profile, to display the identifier of the emotion; and
sending data for displaying the identifier of the identifier of the emotion on the display device.

3. The method of claim 1, further comprising:
accessing an identifier of a source of the one of the plurality of sound volumes, wherein the identifier of the source indicates a virtual object outputting the one of the plurality of sound volumes in the scene;
accessing an identifier of an emotion of the one of the plurality of sound volumes, wherein the emotion is conveyed by the virtual object outputting the one of the plurality of sound volumes; and
sending data for displaying the identifier of the source and the identifier of the emotion on the display device.

4. The method of claim 1, further comprising:
accessing an identifier of a source of the one of the plurality of sound volumes, wherein the identifier of the source indicates a virtual object outputting the one of the plurality of sound volumes in the scene;
accessing an identifier of an emotion of the one of the plurality of sound volumes, wherein the identifier of the emotion indicates an emotion conveyed by the virtual object outputting the one of the plurality of sound volumes; and
sending data for displaying, in three-dimensions, the identifier of the source and the identifier of the emotion on the display device.

5. The method of claim 1, further comprising:
sending data for displaying, within a segment of a circular wheel, a hue indicating a first frequency of the one of the plurality of sound volumes;
sending data for displaying, within the segment of the circular wheel, the hue indicating a second frequency of another one of the plurality of sound volumes.

6. The method of claim 5, wherein the second frequency is twice the first frequency.

7. The method of claim 1, further comprising:
sending data for displaying, within a first row, a hue indicating a first frequency of the one of the plurality of sound volumes;
sending data for displaying, within a second row, the hue indicating a second frequency of another one of the plurality of sound volumes.

8. The method of claim 1, further comprising:
sending data for displaying, within an inner curved portion of a spiral, a hue indicating a first frequency of the one of the plurality of sound volumes;
sending data for displaying, within an outer curved portion of the spiral, the hue indicating a second frequency of another of the plurality of sound volumes.

9. The method of claim 1, further comprising:
sending data for displaying a symbol of a first musical instrument to identify the first musical instrument outputting the one of the plurality of sound volumes;
sending data for displaying a symbol of a second musical instrument to identify the second musical instrument outputting another one of the plurality of sound volumes.

10. A server comprising:
a processor configured to:
compare a plurality of sound volumes output from the scene with a volume of a real-world environment, wherein the scene is displayed on a display device located in the real-world environment;
access a first user profile within a first user account;
access display data based on one of the plurality of sound volumes upon accessing the first user profile;
access a direction identifier providing a directionality, within the scene, of one of the plurality of sound volumes in response to determining that the plurality of sound volumes output from the scene is lower than the volume of the real-world environment; and
send the direction identifier for display on the display device to indicate the directionality of one of the plurality of sound volumes within the scene and provide at least part of the display data for display in a language determined based on the first user profile; and
a memory device coupled to the processor.

11. The server of claim 10, wherein the comparison occurs to determine that the plurality of sound volumes output via the first user account are below a pre-determined threshold, wherein the pre-determined threshold is the volume of the real-world environment, wherein the processor is configured to:
access a second user profile within a second user account;
access an identifier of an emotion conveyed by the one of the plurality of sound volumes upon determining that the plurality of sound volumes are below the pre-determined threshold, wherein the emotion is conveyed by a virtual object outputting the one of the plurality of sound volumes in the scene; and
determine, based on the second user profile, to display the identifier of the emotion; and
send data for displaying the identifier of the emotion on the display device.

12. The server of claim 10, wherein the processor is configured to:
access an identifier of a source of the one of the plurality of sound volumes, wherein the identifier of the source indicates a virtual object outputting the one of the plurality of sound volumes in the scene;
access an identifier of an emotion of the one of the plurality of sound volumes, wherein the emotion is conveyed by the virtual object outputting the one of the plurality of sound volumes; and
send data for displaying the identifier of the source and the identifier of the emotion on the display device.

13. The server of claim 10, wherein the processor is configured to:
access an identifier of a source of the one of the plurality of sound volumes, wherein the identifier of the source indicates a virtual object outputting the one of the plurality of sound volumes in the scene;
access an identifier of an emotion of the one of the plurality of sound volumes, wherein the identifier of the emotion indicates an emotion conveyed by the virtual object outputting the one of the plurality of sound volumes; and
send data for displaying, in three-dimensions, the identifier of the source and the identifier of the emotion on the display device.

14. The server of claim 10, wherein the processor is configured to:
send data for displaying, within a segment of a circular wheel, a hue indicating a first frequency of the one of the plurality of sound volumes;
send data for displaying, within the segment of the circular wheel, the hue indicating a second frequency of another one of the plurality of sound volumes.

15. The server of claim 14, wherein the second frequency is twice the first frequency.

16. The server of claim 10, wherein the processor is configured to:
send data for displaying, within a first row, a hue indicating a first frequency of the one of the plurality of sound volumes;
send data for displaying, within a second row, the hue indicating a second frequency of another one of the plurality of sound volumes.

17. The server of claim 10, wherein the processor is configured to:
send data for displaying, within an inner curved portion of a spiral, a hue indicating a first frequency of the one of the one of the plurality of sound volumes;
send data for displaying, within an outer curved portion of the spiral, the hue indicating a second frequency of another one of the at least the one of the plurality of sound volumes.

18. The server of claim 10, wherein the processor is configured to:
send data for displaying a symbol of a first musical instrument to identify the first musical instrument outputting the one of the plurality of sound volumes;
send data for displaying a symbol of a second musical instrument to identify the second musical instrument outputting another one of the plurality of sound volumes.

19. A client device comprising:
a display device located in a real-world environment, wherein the display device is configured to display a scene;
a processor coupled to the display device, wherein the processor is configured to:
compare a plurality of sound volumes output from the scene with a volume of the real-world environment;
access a first user profile within a first user account;
access display data based on one of the plurality of sound volumes upon accessing the first user profile;
access a direction identifier providing a directionality, within the scene, of one of the plurality of sound volumes in response to determining that the plurality of sound volumes output from the scene is lower than the volume of the real-world environment; and
send the direction identifier for display on the display device to indicate the directionality of one of the plurality of sound volumes within the scene and provide at least part of the display data for display in a language determined based on the first user profile; and
a memory device coupled to the processor.

20. The client device of claim 19, wherein the comparison occurs to determine that the plurality of sound volumes output via the first user account are below a pre-determined threshold, wherein the pre-determined threshold is the volume of the real-world environment, wherein the processor is configured to;
access a second user profile within a second user account;
access an identifier of an emotion conveyed by the one of the plurality of sound volumes upon determining that the plurality of sound volumes are below the pre-determined threshold, wherein the emotion is conveyed by a virtual object outputting the one of the plurality of sound volumes in the scene; and
determine, based on the second user profile, to display the identifier of the emotion; and
send data for displaying the identifier of the emotion on the display device.

21. The client device of claim 19, wherein the processor is configured to:
access an identifer of a source of the one of the plurality of sound volumes, wherein the identifier of the source indicates a virtual object outputting the one of the plurality of sound volumes in the scene;

access an identifier of an emotion of the one of the plurality of sound volumes, wherein the emotion is conveyed by the virtual object outputting the one of the plurality of sound volumes; and send data for displaying the identifier of the source and the identifier of the emotion on the display device.

22. The client device of claim 19, wherein the processor is configured to:

access an identifier of a source of the one of the plurality of sound volumes, wherein the identifier of the source indicates a virtual object outputting the one of the plurality of sound volumes in the scene;

access an identifier of an emotion of the one of the plurality of sound volumes, wherein the identifier of the emotion indicates an emotion conveyed by the virtual object outputting the one of the plurality of sound volumes; and send data for displaying, in three-dimensions, the identifier of the source and the identifier of the emotion on the display device.

\* \* \* \* \*